(12) United States Patent
Self et al.

(10) Patent No.: US 9,216,628 B2
(45) Date of Patent: Dec. 22, 2015

(54) APPARATUS AND METHODS FOR VEHICLE IDLE MANAGEMENT

(71) Applicants: Lance D. Self, Vinemont, AL (US); Tod M. Bennett, Cullman, AL (US)

(72) Inventors: Lance D. Self, Vinemont, AL (US); Tod M. Bennett, Cullman, AL (US)

(73) Assignee: ZERO RPM, INC., Cullman, AL (US)

( * ) Notice: Subject to any disclaimer, the term of this patent is extended or adjusted under 35 U.S.C. 154(b) by 0 days.

(21) Appl. No.: 13/869,211

(22) Filed: Apr. 24, 2013

(65) Prior Publication Data

US 2014/0148975 A1    May 29, 2014

Related U.S. Application Data

(60) Provisional application No. 61/637,579, filed on Apr. 24, 2012.

(51) Int. Cl.
| | | |
|---|---|---|
| *G06F 7/00* | (2006.01) | |
| *B60H 1/00* | (2006.01) | |
| *F25B 19/00* | (2006.01) | |

(52) U.S. Cl.
CPC ............ *B60H 1/00642* (2013.01); *F25B 19/00* (2013.01); *Y10T 29/49002* (2015.01)

(58) Field of Classification Search
CPC .................................................. B60H 1/00642
USPC ........................ 701/2, 36; 123/179.19, 179.3
See application file for complete search history.

(56) References Cited

U.S. PATENT DOCUMENTS

| | | |
|---|---|---|
| 4,762,170 A | 8/1988 | Nijjar et al. |
| 7,146,959 B2 | 12/2006 | Thompson et al. |
| 7,259,469 B2 * | 8/2007 | Brummett et al. .......... 290/40 C |
| RE40,286 E * | 5/2008 | Biess et al. ............. 123/142.5 R |
| 7,797,958 B2 | 9/2010 | Alston et al. |

(Continued)

OTHER PUBLICATIONS

Brodrick, et al., "Potential Benefits of Utilizing Fuel Cell Auxiliary Power Units in Lieu of Heavy-Duty Truck Engine Idling", Institute of Transportation Studies, UC Davis, Jan. 1, 2001, US.

(Continued)

*Primary Examiner* — Thomas G Black
*Assistant Examiner* — Luke Huynh
(74) *Attorney, Agent, or Firm* — Bush Intellectual Property Law; Kenneth M. Bush

(57) ABSTRACT

An idle management system for a vehicle is disclosed herein. In various aspects, the idle management system includes an auxiliary power storage unit for the storage of electrical power. The idle management system includes an environmental package adapted to interconnect with a vehicle environmental package to regulate the climate within a vehicle compartment of a vehicle. The environmental package may be in electrical communication with the power storage unit to receive electrical power therefrom. A controller may be in communication with the power storage unit to derive electrical power therefrom, and the controller may be in communication with the environmental package to regulate the operation thereof. The idle management system may draw electrical power from the power storage unit to be operable with an engine in an engine OFF condition.

13 Claims, 12 Drawing Sheets

(56) References Cited

U.S. PATENT DOCUMENTS

| | | | |
|---|---|---|---|
| 8,118,005 B2 | 2/2012 | Bradley et al. | |
| 2005/0056040 A1* | 3/2005 | Motush et al. | 62/292 |
| 2006/0000228 A1 | 1/2006 | Fisher | |
| 2008/0085672 A1* | 4/2008 | Creed et al. | 454/69 |
| 2009/0014150 A1 | 1/2009 | Masters et al. | |
| 2009/0177336 A1 | 7/2009 | McClellan et al. | |
| 2009/0211280 A1 | 8/2009 | Alston | |
| 2011/0112969 A1* | 5/2011 | Zaid et al. | 705/50 |
| 2011/0288743 A1 | 11/2011 | Smith | |
| 2011/0320109 A1 | 12/2011 | Polimeno | |

OTHER PUBLICATIONS

Brodrick, et al., "Evaluation of Fuel Cell Auxiliary Power Units for Heavy-Duty Diesel Trucks", Institute of Transportation Studies, UC Davis, Jun. 1, 2002, US.

Grupp, et al., "Design Considerations for a PEM Fuel Cell Powered Truck APU", Institute of Transportation Studies, UC Davis, Jul. 1, 2004, US.

Agnolucci, "Prospects of Fuel Cell Auxiliary Power Units in the Civil Markets", UKSHEC Policy Studies Institute, May 2006, London.

http://en.wikipedia.org/wiki/Auxiliary_power_unit 6 pages from website dated May 11, 2012, and directed to an auxiliary power unit.

* cited by examiner

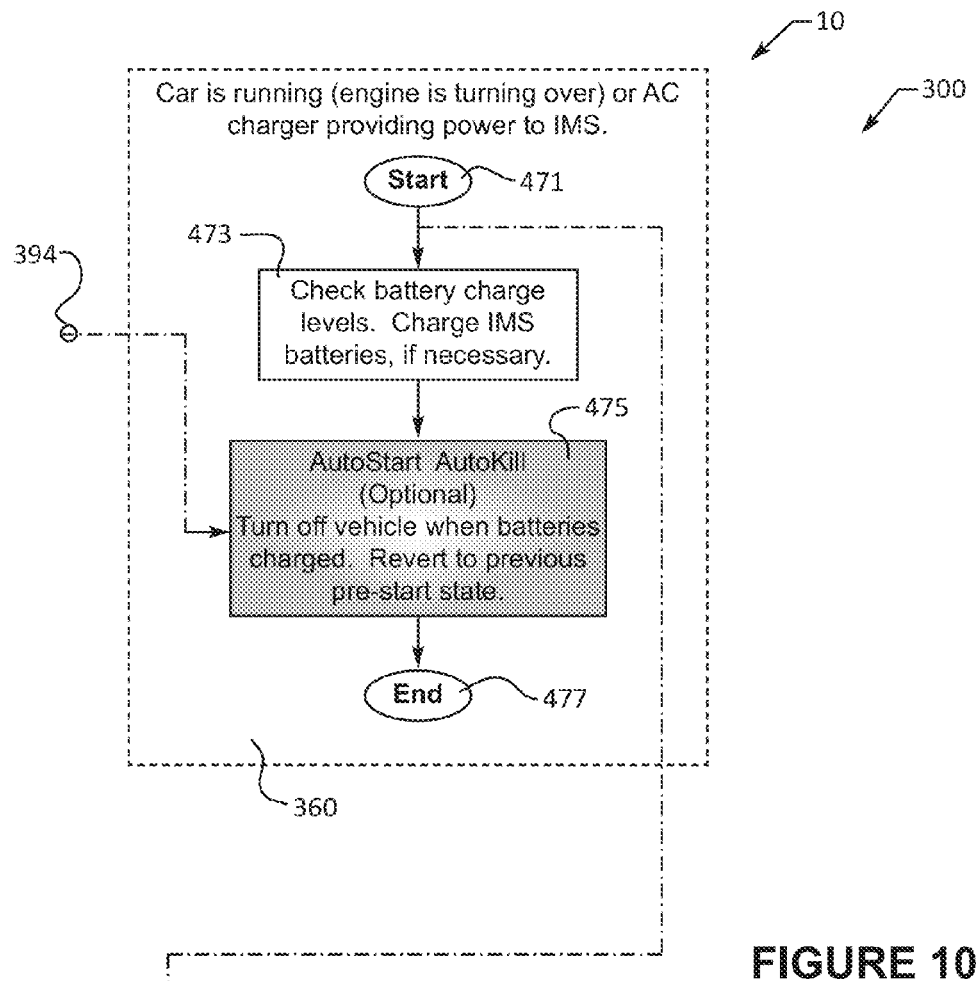
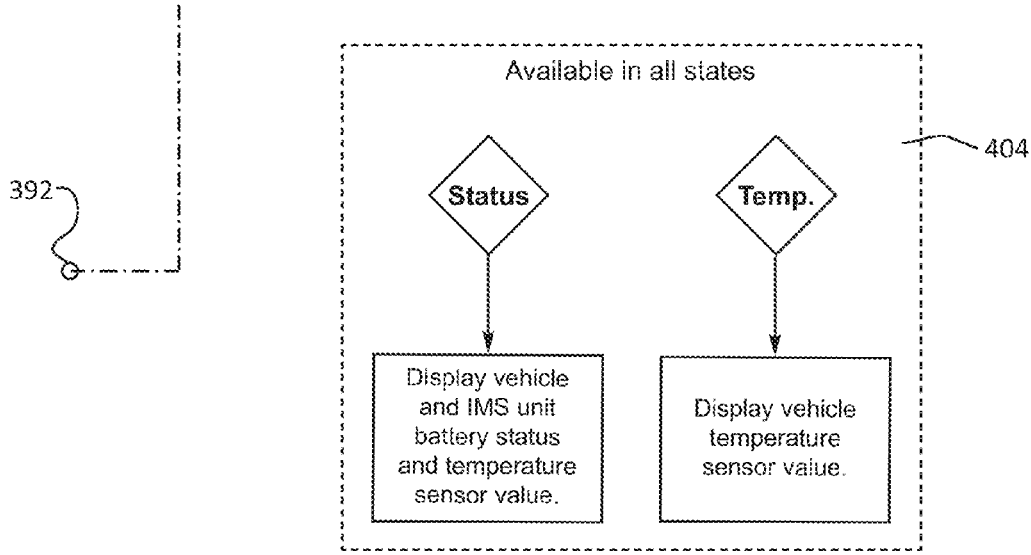
FIGURE 10B

APPARATUS AND METHODS FOR VEHICLE IDLE MANAGEMENT

CROSS-REFERENCE TO RELATED APPLICATIONS

This application claims the priority and benefit of U.S. Provisional Patent Application No. 61/637,579 filed Apr. 24, 2012, which is hereby incorporated by reference in its entirety herein.

FIELD OF THE INVENTION

The present disclosure is directed to an idle management system that powers a vehicle's electronic systems and/or climate control system while the vehicle's engine is off.

BACKGROUND OF THE INVENTION

Power generated from an internal combustion engine of a vehicle may be used to operate various vehicle systems including, for example, HVAC system, electronic system, and computer system, when the engine is running. When the engine is off, a vehicle battery may provide power to operate vehicle systems and to start the vehicle. However, providing power to vehicle systems from the vehicle battery when the engine is off will drain power from the battery until the battery has insufficient power to operate the vehicle systems including the starter to start the engine. As a result, vehicle operators that need to use the vehicle systems while the vehicle is parked may allow the vehicle to idle (i.e. run the engine at some minimal rpm to produce power from the engine). Examples of vehicles that may be idled while parked include police vehicles, ambulances, fire trucks, buses, and recreational vehicles (RV's). As the cost of fuel has increased and concerns about fuel conservation and the emission of pollutants has grown, it has become desirous to reduce or eliminate engine idling.

Accordingly, there is a need for improved apparatus as well as related methods that power the systems of the vehicle while the vehicle's engine is off

SUMMARY OF THE INVENTION

These and other needs and disadvantages may be overcome by the apparatus and related methods disclosed herein. Additional improvements and advantages may be recognized by those of ordinary skill in the art upon study of the present disclosure.

An idle management system for a vehicle is disclosed herein. In various aspects, the idle management system includes a power storage unit for the storage of electrical power. The idle management system includes an environmental package adapted to interconnect with a vehicle environmental package to regulate the climate within a vehicle compartment of a vehicle, in various aspects. The environmental package may be in electrical communication with the power storage unit to receive electrical power therefrom. A controller may be in communication with the power storage unit to derive electrical power therefrom, and the controller may be in communication with the environmental package to regulate the operation thereof. The idle management system may draw electrical power from the power storage unit to be operable with an engine in an engine OFF condition, in various aspects.

The idle management system may include a heater adapted to provide heat to coolant in order to heat a vehicle compartment of the vehicle, in various aspects. The heater may draw electrical power from the power storage unit to be operable with the engine in an engine OFF condition, in various aspects.

The idle management system may include a compressor adapted to communicate working fluid with a vehicle environmental package. The compressor may draw electrical power from the power storage unit to be operable with an engine in the engine OFF condition, in various aspects.

The idle management system may be adapted to flow electrical power from the power storage unit to the vehicle electrical system to power the vehicle electrical system, in various aspects. The idle management system may be adapted to start the engine from the engine OFF condition into the engine ON condition or to shut down the engine from the engine ON condition to the engine OFF condition, in various aspects.

Exemplary methods of operation of the idle management system are disclosed herein. Exemplary methods of installation of the idle management system are disclosed herein.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

BRIEF DESCRIPTION OF THE DRAWINGS

FIG. 10B illustrates by process flow chart exemplary operations of the exemplary implementation of the idle management system of FIG. 1;

Figure 1:
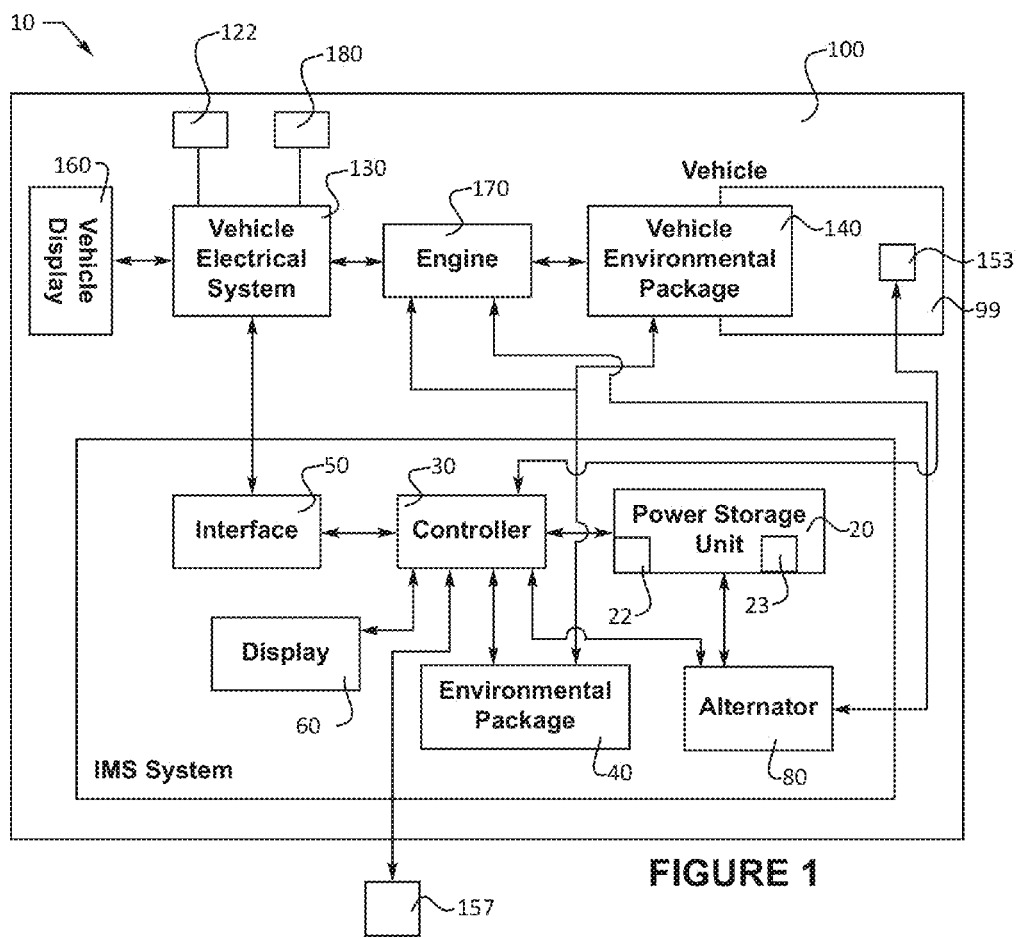
FIG. 1 illustrates by schematic diagram an exemplary implementation of an idle management system.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof.

DETAILED DESCRIPTION OF THE INVENTION

FIG. 1 illustrates idle management system (IMS) 10, which is an implementation of an idle management system. As illustrated in FIG. 1, idle management system 10 includes power storage unit 20, controller 30, environmental package 40, interface 50, alternator 80, and display 60.

Power storage unit 20 is configured for the storage of electrical power that powers idle management system 10. Power storage unit 20 may include one or more batteries 22, 23 along with the associated electronics. The battery, such as battery 22, 23 in idle management system 10, may be, for example, lithium based, or nickel-cadmium. In various implementations, the battery may have a charge density of at least about 250 W/kg.

Controller 30, as illustrated in FIG. 1, regulates the operation of idle management system 10. Controller 30 may regulate the operation of idle management system 10 in response to signals from display 60, in response to signals from vehicle electrical system 130, or in response to signals from power storage unit 20, environmental package 40, interface 50, and display 60. For example, controller 30 communicates with power storage unit 20 to regulate the flow of electrical power therewith including the charging of battery 22, 23 and the flowing of electrical power from power storage unit 20 to environmental package 40 to power environmental package 40. Controller 30 may monitor the charge within power storage unit 20.

Controller 30 may monitor the status of vehicle electrical system 130 including, for example, the electrical loads upon vehicle electrical system 130, key position (Off, On, Start), vehicle display 160 including user inputs from vehicle display or the display of information to the user using vehicle display 160, or the charge of vehicle battery 122. Controller 30 may regulate the flow of electrical current into vehicle electrical system 130 from power storage unit 20 in response to the status of vehicle electrical system 130 including electrical loads upon vehicle electrical system 130 or the charge of vehicle battery 122. Controller 30 may communicate with temperature sensors 153, 157, and may use temperature values from sensors 153, 157 to regulate the operation of environmental package 40.

Controller 30 may include a clock, microprocessor, memory, digital input channel, analogue input channel, a digital output channel, an analogue output channel, an analogue to digital converter, or a digital to analogue converter, in various implementations. In various implementations, controller 30 may include one or more ports adapted for USB or Ethernet connection. In various implementations, controller 30 may be adapted for wireless Internet communication or for cellular communication. In various implementations, controller 30 may include programmable logic module nLC-055-012D-08I-04QRD-05A manufactured by Phoenix Contact Inc. of 586 Fulling Mill Road, Middletown, Pa. 17057.

Alternator 80, as illustrated in FIG. 1, communicates mechanically with engine 170 of vehicle 100, and engine 170 may power alternator 80. In various aspects, engine 170 is an internal combustion engine. Alternator 80 communicates electrically with power storage unit 20 to provide electrical power to power storage unit 20 for recharging batteries 22, 23, as required. Alternator 80 may be an intelligent alternator, and controller 30 may regulate the operation of alternator 80, in various implementations. Vehicle alternator 180, which is powered by engine 170, may provide electrical power to power storage unit 20 to charge power storage unit 20. Vehicle alternator 180 may provide electrical power to vehicle battery 122 to charge vehicle battery 122.

As illustrated in FIG. 1, idle management system 10 includes environmental package 40, and controller 30 communicates with environmental package 40 to regulate the operation thereof. Environmental package 40 is operably connectable with a vehicle environmental package 140 to affect the climate within vehicle compartment 99 of vehicle 100. As illustrated in FIG. 1, portions of vehicle environmental package 140 extend into vehicle compartment 99 of vehicle 100 to regulate the environment therein. An implementation of portions of environmental package 40 is described in FIGS. 3 and 4. Environmental package 40 in combination with vehicle environmental package 140 may, for example, affect the environment within vehicle compartment 99 of vehicle 100 by heating vehicle compartment 99 of vehicle 100, cooling vehicle compartment 99 of vehicle 100, providing ventilation to vehicle compartment 99 of vehicle 100, defrosting, or filtering the air within vehicle compartment 99 of vehicle 100.

Controller 30 may respond to signals from vehicle electrical system 130, signals from display 60, or both, and controller 30 may regulate the operation of environmental package 40 in response to signals from vehicle electrical system 130 or signals from display 60.

Interface 50, illustrated in FIG. 1, is formed to operably connect power storage unit 20 and controller 30 with vehicle electrical system 130 of vehicle 100. Power storage unit 20 may flow electrical power to vehicle electrical system 130 to power the vehicle electrical system 130. In some implementations, power may flow from vehicle electrical system 130 to power storage unit 20 via interface 50 to charge battery 22, 23 of power storage unit 20.

Display 60 provides a user interface for idle management system 10, and display 60 may be operably connected with controller 30. Display 60 may accept user input from the user and may communicate information related to the status or operation of idle management system 10 to the user. A user may control operations of idle management system 10 using display 60, and user input may be communicated from display 60 to controller 30, and controller 30 may regulate the operation of idle management system 10 in response to user inputs received via display 60. Display 60 may communicate information from idle management system 10 to the user, and the information communicated to the user may be received by the display 60 from controller 30.

Temperature sensor 153 lies within vehicle compartment 99 of vehicle 100 and temperature sensor 153 communicates with controller 30 to allow controller 30 to regulate the temperature within vehicle compartment 99 produced by environmental package 40 by regulation of environmental package 40. Temperature sensor 157 lies exterior to vehicle 100 and communicates with controller 30 to allow the controller 30 to monitor the exterior temperature. Controller 30 may alter the operation of idle management system 10 including the operation of environmental package 40 depending upon temperature values detected by temperature sensors 153, 157.

Figure 2:
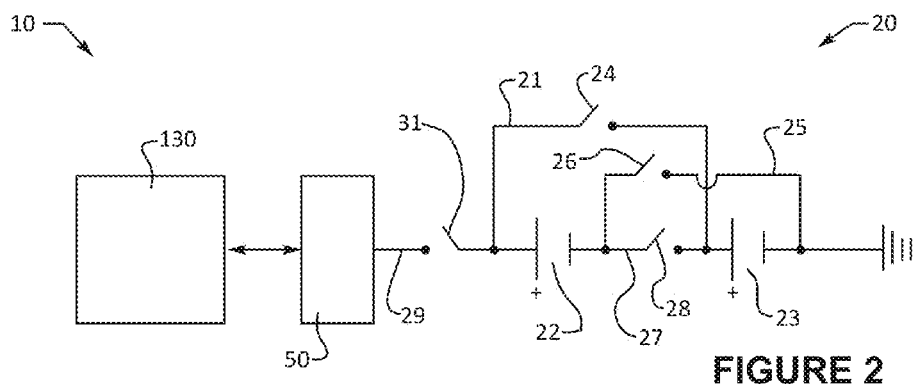
FIG. 2 illustrates by schematic diagram portions of the exemplary implementation of the idle management system of FIG. 1.

FIG. 2 illustrates power storage unit 20. As illustrated in FIG. 2, power storage unit 20 includes battery 22 and battery 23 interconnected by pathways 21, 25, 27, and switches 24, 26, 28 regulate the flow of current in pathways 21, 25, 27, respectively. With switches 24, 26 in an ON position and switch 28 in an OFF position, batteries 22, 23 flow current in parallel to vehicle electrical system 130 through pathway 29 and interface 50, as illustrated. With switches 24, 26 in an OFF position and switch 28 in an ON position, batteries 22, 23 flow current in series to vehicle electrical system 130 through pathway 29 and interface 50. Switches 24, 26, 28 may be operably connected with controller 30 so that controller 30 can toggle switches 24, 26, 28 between the ON position and the OFF positions to connect batteries 23, 23 in either series or parallel. Other implementations may include more or fewer batteries. In implementations having more than two batteries, such as batteries 22, 23, additional switches, such as switches 24, 26, 28, and additional electrical pathways, such as pathways 21, 25, 27, may be provided to allow the batteries to be placed in series connection or parallel connection or combinations thereof. Various implementations may include switch 31 in pathway 29, and switch 31 may be connected to controller 30 to allow the controller to control the flow of current from batteries 22, 23 through pathway 29 to interface 50 and vehicle electrical system 130 by the toggling of switch 31.

Figure 3:
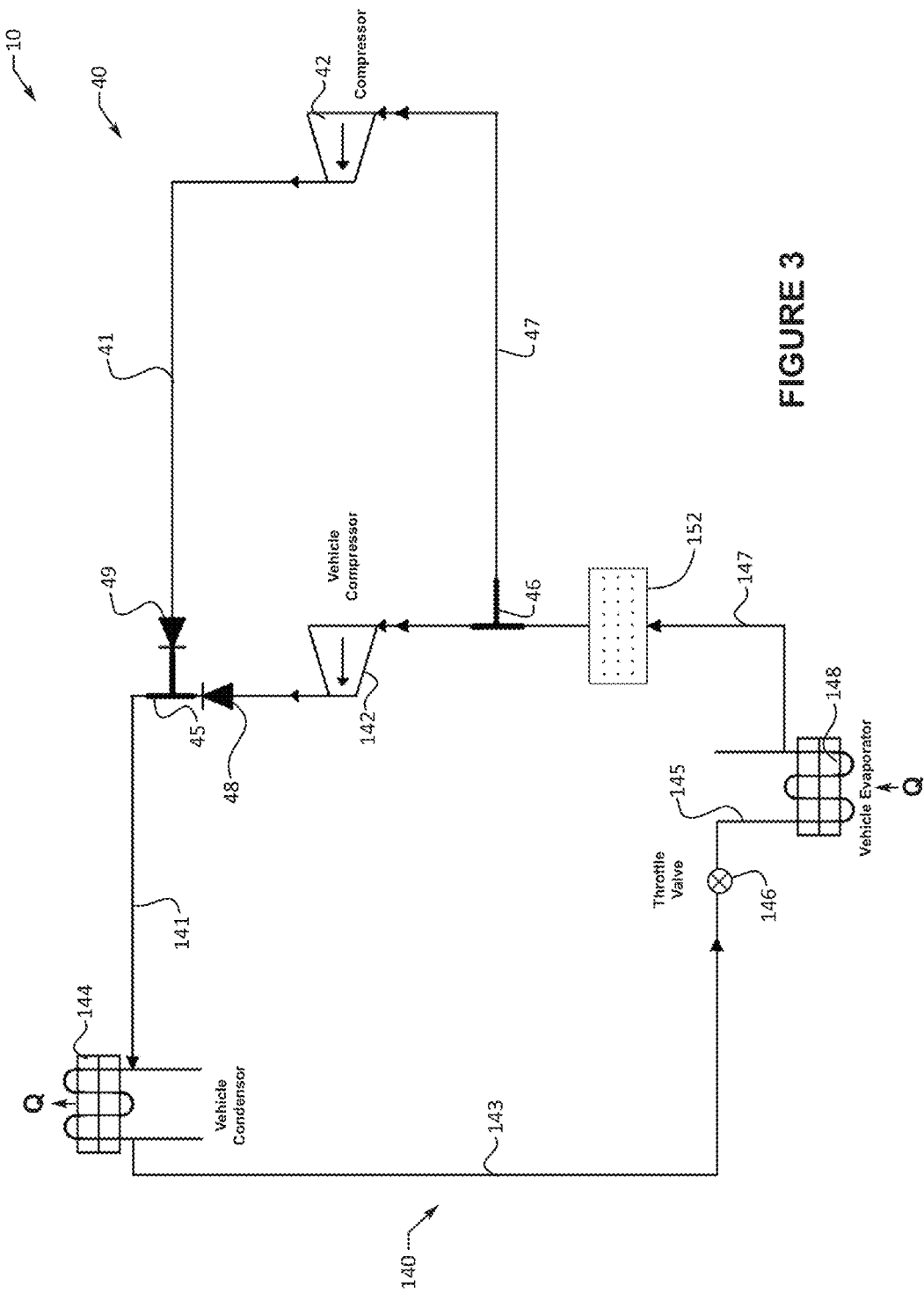
FIG. 3 illustrates by schematic diagram portions of the exemplary implementation of the idle management system of FIG. 1.

FIG. 3 illustrates portions of environmental package 40 of idle management system 10 interconnected with portions of vehicle environmental package 140. The arrows indicate the flow of working fluid within environmental package 40 and vehicle environmental package 140.

Figure 4:
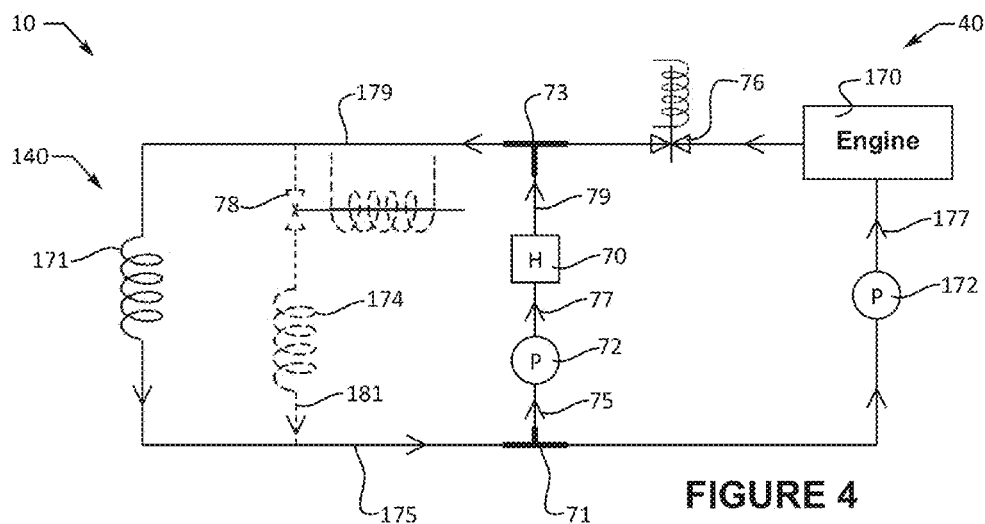
FIG. 4 illustrates by schematic diagram portions of the exemplary implementation of the idle management system of FIG. 1.

Environmental package 40, as illustrated in FIG. 3, includes compressor 42, Tee's 45, 46 and lines 41, 47. Environmental package 40 may include pump 72, heater 70, valve 76, valve 78, and Tee's 71, 73, as illustrated in FIG. 4. Environmental package 40 may include, for example, temperature sensors, such as temperature sensors 153, 157, humidity sensors, heat exchangers, fans, or blowers, in various implementations.

Vehicle environmental package, as illustrated in FIG. 3, includes lines 141, 143, 145, 147, vehicle compressor 142, vehicle condenser 144, throttle valve 146, and vehicle evaporator 148. Line 141 connects vehicle compressor 142 with vehicle condenser 144, line 143 connects vehicle condenser 144 with throttle valve 146, line 145 connects throttle valve 146 with vehicle evaporator 148, and line 147 connects vehicle evaporator 148 to vehicle compressor 142, as illustrated.

As illustrated in FIG. 3, environmental package 40 of idle management system 10 may be interconnected with portions of vehicle environmental package 140 by interconnection of line 47 interconnected with line 147 of vehicle environmental package 140 through Tee 46, and interconnection of line 41 with line 141 of vehicle environmental package 140 through Tee 45. Tee 46 is inserted into line 147 to attach environmental package 40 to vehicle environmental package 140, as illustrated in FIG. 3. Also, as illustrated in FIG. 3, Tee 45, which may include check valves 48, 49, is inserted into line 141 to attach environmental package 40 to vehicle environmental package 140. Tee 45 is further described in FIGS. 8A, 8B, and 8C. Tee 46, in this implementation, is a straight Tee that allows flow through the three branches of said Tee.

Vehicle compressor 142 may be placed alternately in an OFF state or in an ON state, and compressor 42 may be placed alternately in an ON state or in an OFF state, in reverse correspondence to the state of vehicle compressor 142. When in the ON state, vehicle compressor 142 is driven by mechanical power communicated from engine 170 of vehicle 100. Compressor 42 in the ON state may be driven by electrical power communicated from power storage unit 20, and compressor 42 may include an electric motor (not shown) and related mechanisms. In various implementations, compressor 42 may be a variable speed compressor driven by a variable speed DC electric motor, and controller 30 may regulate the speed of compressor 42 by regulating the speed of the DC electric motor. In various implementations, the DC motor may be configured for 12V or for 24V.

Vehicle compressor 142 may be in the ON state when compressor 42 is in the OFF state, and vehicle compressor 142 is in the OFF state when compressor 42 is in the ON state, in the implementation illustrated in FIG. 3. Controller 30 may communicate with compressor 42 to place compressor 42 between the ON state and the OFF state. Controller 30 may detect that the engine is in the engine ON condition or in the engine OFF condition by communications with vehicle electrical system 130, and controller 30 may prevent placement of compressor 42 into the ON state when engine 170 is in the engine ON condition. The controller 30 may detect the key position and may allow operations of at least portions of idle management system 10 such as compressor 42 or heater 70 (see FIG. 4) when the key is in certain key positions. For example, controller 30 may allow compressor 42 to be in the ON state only when the key is in the ON position.

Figure 13:
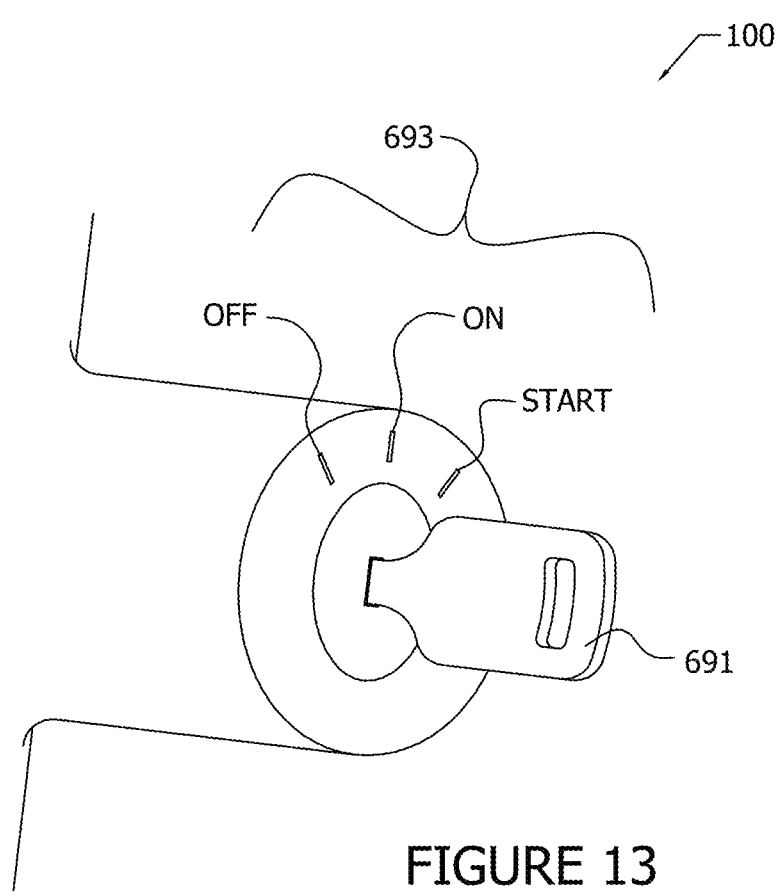

FIG. 13 further illustrates key positions of key 691 received in ignition of vehicle 100. As illustrated in FIG. 13, key 691 may be positioned between key positions 693 that include the OFF position, the ON position, and the START position. Controller may detect key position 693 of key 691, and controller 30 may control the operation of idle management system 10 based upon the key position of key 691. For example, idle management system 10 may be allowed to operate only when key 691 is in the ON position and engine 170 is in the OFF condition.

With vehicle compressor 142 in the ON state and compressor 42 the OFF state, a working fluid enters compressor 142 of vehicle environmental package 140 in the vapor phase, as illustrated in FIG. 3. The working fluid may be, for example, any of various chlorofluorocarbons (Freon), difluoromethane, pentafluoro ethane, tetrafluoroethane, tetrafluoropropene, or other refrigerant or combination of refrigerants. Lines, such as lines 41, 47, 141, 143, 145, 147 may be formed of hoses, piping, various fittings and connectors, and so forth as may be suitable for the communication of the working fluid.

With continued reference to FIG. 3, vehicle compressor 142 compresses the working fluid, which enters vehicle compressor 142 in the vapor phase through line 147. The working fluid exits vehicle compressor 142 as a superheated vapor through line 141. The working fluid passes from vehicle compressor 142 through line 141 including check valve 48 and Tee 45 as superheated vapor to vehicle condenser 144. As the working fluid passes through the vehicle condenser 144, the working fluid is cooled such that the superheat along with some additional heat is removed. Accordingly, the working fluid condenses from superheated vapor into a liquid phase as the working fluid passes through vehicle condenser 144. The working fluid passes through line 143 from vehicle condenser 144 to throttle valve 146 in the liquid phase. As the working fluid passes from line 143 into line 145 through throttle valve 146, the pressure in the working fluid is decreased causing the working fluid to flash from the liquid phase into a liquid-vapor mixture. The working fluid passes as liquid-vapor mixture from throttle valve 146 through line 145 into vehicle evaporator 148, where the working fluid is vaporized from the liquid-vapor mixture into the vapor phase. The working fluid in the vapor phase returns to vehicle compressor 142 from vehicle evaporator 148 through line 147 including Tee 46, thereby completing the cycle. Various implementations may include dryer 152, which may be interposed, for example, in line 147 to remove moisture from the working fluid, as illustrated. Dryer 152 may be otherwise positioned, in line 141, for example, in other implementations.

Heat Q is ejected from the working fluid at vehicle condenser 144 and heat Q (ignoring irreversibilities) is absorbed into the working fluid at vehicle evaporator 148. In various implementations, heat Q may be introduced into vehicle compartment 99 of vehicle 100 from vehicle condenser 144 or heat Q may be removed from vehicle compartment 99 of vehicle 100 by vehicle evaporator 148. In various implementations, heat Q may be used to defrost window(s) of vehicle 100.

With vehicle compressor 142 in the OFF state and compressor 42 in the ON state, the working fluid, which is in the vapor phase as a result of having passed through vehicle evaporator 148, passes from line 147 through Tee 46 into line 47. The working fluid passes from line 47 into compressor 42, and compressor 42 compresses working fluid into superheated vapor. The working fluid in the form of superheated vapor passes from compressor 42 through line 41 and thence through Tee 45 into line 141 to vehicle condenser 144, and thence through throttle valve 146 and vehicle evaporator 148 via lines 143, 145, respectively. The working fluid returns to compressor 42 from vehicle evaporator 148 via line 147, through Tee 46, and line 47, as illustrated. Check valve 48 prevents backflow of the working fluid through vehicle compressor 142 when vehicle compressor 142 is OFF and compressor 42 is ON. Check valve 49 prevents backflow of the working fluid through line 41 and through compressor 42 when vehicle compressor 142 is ON and compressor 42 is OFF. In various implementations, check valves 48, 49 may be either formed as an integrated portion of Tee 45 or may be separate elements from Tee 45.

FIG. 4 illustrates portions of environmental package 40 of idle management system 10 interconnected with portions of vehicle environmental package 140. The arrows indicate the flow of coolant within environmental package 40 and vehicle environmental package 140. The coolant flowing within the portions of environmental package 40 and the portions of vehicle environmental package 140 illustrated in FIG. 4 may be an antifreeze mixture as would be used in the cooling of an internal combustion engine such as engine 170. The coolant may be, for example, a water-methanol mixture, a water-propylene glycol mixture, a water-glycerol mixture, or a water-ethylene glycol mixture. Lines 75, 77, 79, 175, 179 may include various passages about engine 170, hoses, fittings, connectors, and so forth as would be suitable for the communication of the coolant.

As illustrated in FIG. 4, pump 172 mechanically cooperates with engine 170 such that engine 170 powers pump 172. Accordingly, pump 172 is either in an ON condition or an OFF condition as engine 170 is in an engine ON condition or an engine OFF condition.

With engine 170 in the engine ON condition, pump 172 is in the ON condition and the coolant is pumped through pump 172 from line 175 to line 177, as illustrated. Pump 72 is in an OFF condition, heater 70 is in an OFF condition so that no heat is discharged into the coolant by heater 70, and valve 76 and valve 78 (in implementations including heat exchanger 174) are in an OPEN position to allow the coolant to pass therethrough when pump 172 is in the ON condition. Valves 76, 78 may be solenoid valves, and valves 76, 78 may be in communication with controller 30 so that controller 30 may position valves 76, 78 between the CLOSED position (no flow) and the OPEN position (flow).

With pump 172 in the ON condition, the coolant is discharged by pump 172 into line 177, and the coolant passes from line 177 through engine 170 where heat is input into the coolant by engine 177. The heat input into the coolant by engine 177 is waste heat from combustion within engine 170, so that the coolant cools engine 170 by the removal of the waste heat. The coolant may pass through various passages about engine 170 that allow for the transfer of heat from engine 170 into the coolant. The coolant passes from engine 170 into line 179 for conveyance to heat exchanger 171. The coolant ejects the heat derived from engine 170 at heat exchanger 171, and the heat so ejected at heat exchanger 171 may be used to warm vehicle compartment 99 of vehicle 100. The coolant passes from heat exchanger 171 into line 175 for return to pump 172. The cycle repeats.

Some implementation of vehicle environmental package 140 may include line 181 with heat exchanger 174 disposed therein. Line 181 is interconnected with line 179 and with line 175, as illustrated. In such implementation, a portion of the coolant may pass from line 179 through line 181 including through heat exchanger 174 and thence into line 175 for return to pump 172. Heat exchanger 174 may be used to warm various portions of vehicle 100 such as, for example, a rear compartment or a cargo compartment thereof.

With engine 170 in the engine OFF condition, pump 172 is in the OFF condition, pump 72 may be in an ON condition, heater 70 may be in the ON condition to discharge heat into the coolant as the coolant passes through heater 70 as conveyed by pump 72, and valve 76 may be in the CLOSED position to prevent the coolant from passing through engine 170. As illustrated in FIG. 4, line 75 is interconnected with line 175 by Tee 71, and line 79 is interconnected with line 179 by Tee 73. When pump 72 is in the ON condition, pump 72 draws the coolant from line 175 through Tee 71 into line 75, and pump 72 discharges the coolant into line 77. The coolant passes through line 77, through heater 70, and into line 79. The coolant flows from line 79 into line 179 through Tee 73. Tee's 71, 73 are straight Tee connectors that allow flow to pass through any of the three branches of each Tee.

Heat is input into the coolant by heater 70 as the coolant passes through heater 70 from line 77 into line 79. The coolant then passes from heater 70 through line 79, through Tee 73, into line 179 where the coolant may cycle through heat exchanger 171, and back to pump 72 through line 175, Tee 71, and line 75, consecutively, thereby closing the cycle. Heater 70 and pump 72 electrically cooperate with power storage unit 20 to draw electrical power therefrom. Heater 70 and pump 72 communicate with controller 30 so that controller 30 may control the operation of heater 70 and pump 72.

In implementations that include line 181 with heat exchanger 174 disposed therein, valve 78 may be placed in the CLOSED position to prevent flow through heat exchanger 174 when engine 170 in the engine OFF condition and pump 72 is in the ON condition and the coolant is being heated by heater 70.

Figure 5:
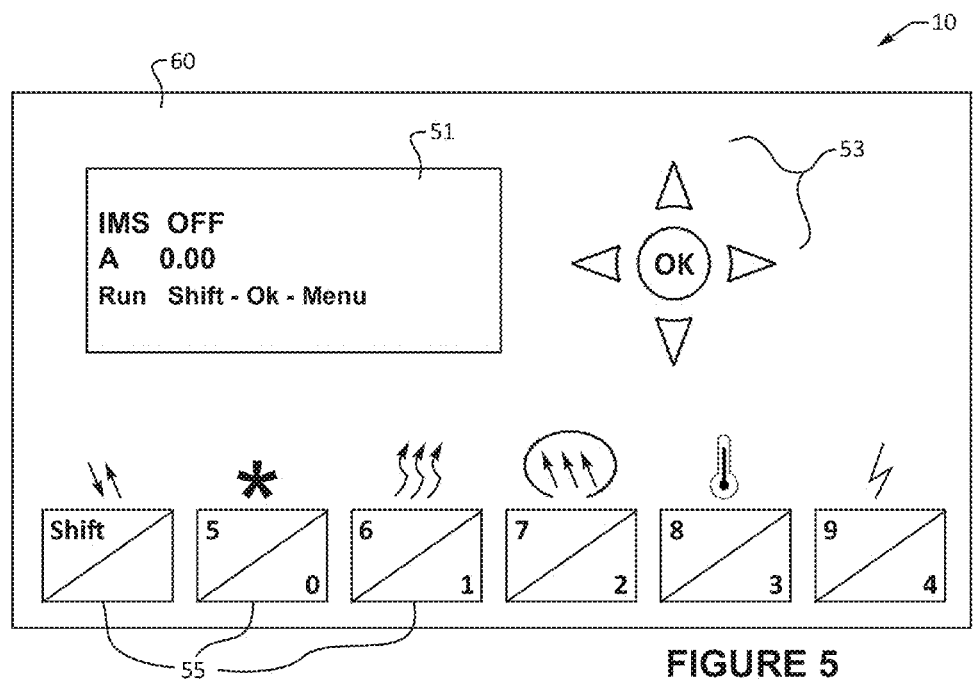
FIG. 5 illustrates by frontal view portions of the exemplary implementation of the idle management system of FIG. 1.

FIG. 5 illustrates an implementation of display 60, which is in communication with controller 30, that includes display screen 51 for the display of information related to vehicle 100 or idle management system 10 to the user. Display 60, as illustrated, includes buttons 53 configured to allow the user to navigate various items displayed upon display screen 51. Display 60 may accept user input so that the user may control idle management system 10 using display 60. Buttons 53, 55, and screen 51 are adapted to accept user input into display 60, in this implementation. In various implementations, display 60 may include indicator light(s) or various combinations of dials, switches, buttons, knobs, and so forth, as would be readily understood by one of ordinary skill in the art upon review of this disclosure, to allow for user input into display 60 for the control of idle management system 10 or for the communication of information from idle management system 10 to the user. The display may be, for example, display unit nLC-OP1-LCD-032-4X20 manufactured by Phoenix Contact Inc. of 586 Fulling Mill Road, Middletown, Pa. 17057.

Figure 6B:
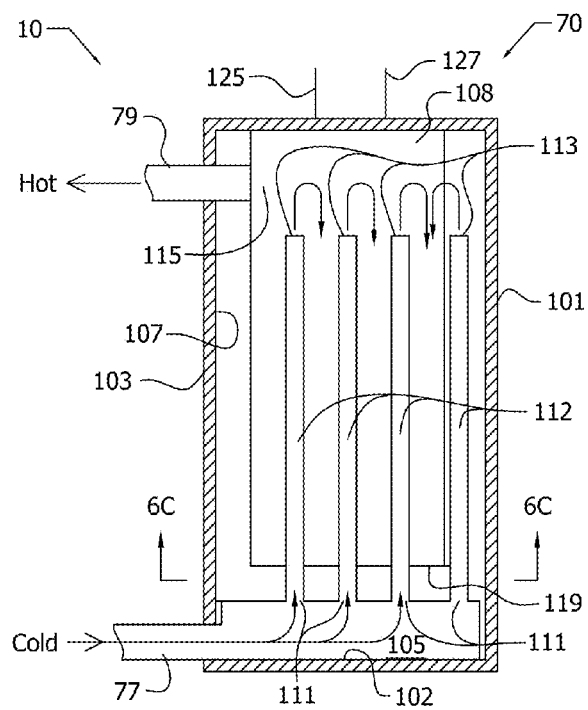
FIG. 6B illustrates by cut-away side view the portions of the idle management system illustrated in FIG. 6A.
Figure 6C:
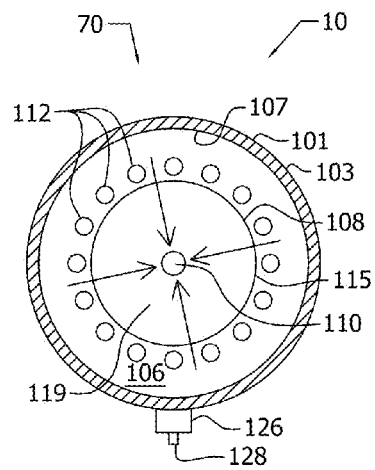
FIG. 6C illustrates by cut-away cross sectional view the portions of the idle management system illustrated in FIG. 6A.
Figure 6D:
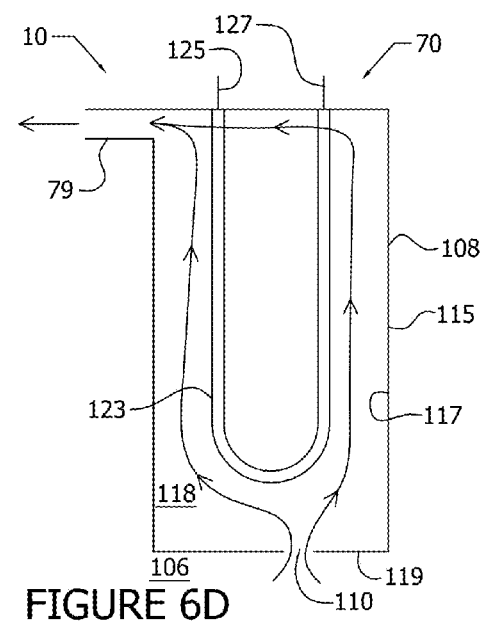
FIG. 6D illustrates by cut-away side view exemplary components within the portions of the idle management system illustrated in FIG. 6A.
Figure 6A:
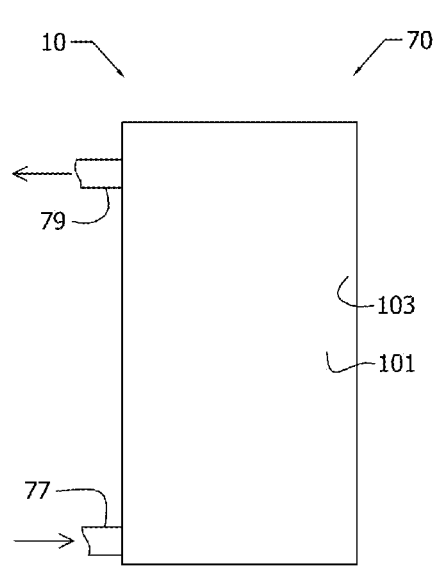
FIG. 6A illustrates by side view portions of the exemplary implementation of the idle management system of FIG. 1.

FIGS. 6A-6D illustrate an implementation of heater 70. Arrows in FIGS. 6A-6D indicate the flow of the coolant as the coolant passes through heater 70. As illustrated in FIG. 6A, heater 70 includes outer shell 101 with outer surface 103. Cold coolant enters heater 70 through line 77 and heated coolant exits heater 70 through line 79, as illustrated (see also FIG. 4).

As the coolant enters heater 70, the coolant passes from line 77 into chamber 105 defined by plenum 102, as illustrated in FIG. 6B. Plenum 102 distributes the coolant into pipe ends 111 of pipes 112 in this implementation. The coolant may pass from chamber 105 through pipes 112 entering through pipe ends 111 and exiting through pipe ends 113 into chamber 106. Chamber 106 (see FIG. 6C), in this implementation, is defined by inner surface 107 of outer shell 101 and outer surface 115 of inner shell 108.

The coolant flows from chamber 106 into chamber 118 through inlet 110, as illustrated in FIGS. 6C and 6D. Chamber 118 is defined by inner surface 117 (see FIG. 6D) of inner shell 108. As illustrated in FIGS. 6B and 6C, outer shell 101 and inner shell 108 are cylindrical in shape with inner shell 108 in spaced relation within outer shell 101.

As illustrated in FIG. 6C, chamber 106 is formed as an annular region between inner surface 107 of outer shell 101 and outer surface 115 of inner shell 108. Pipes 112 are located circumferentially about inner shell 108 within chamber 106. As illustrated, pipes 112 are set apart from outer surface 115 of inner shell 108, while, in other implementations, pipes 112 may be biased against outer surface 115 of inner shell 108.

Inlet 110 is located at the center of circular shaped end 119 of inner shell 108, in this implementation, and end 119 is positioned within chamber 106 proximate plenum 102. Other implementation may include more inlets, and the one or more inlets may be otherwise located about inner shell 108.

As illustrated in FIG. 6D, the coolant passes from chamber 106 through inlet 110 into chamber 118 within inner shell 108. Chamber 118 is bounded by inner surface 117 of inner shell 117, in this implementation. Resistive heating element 123 lies within chamber 118, and is electrically connected to power storage unit 20 by connectors 125, 127. When powered, resistive heating element 123 produces heat by electrical resistance to heat the coolant. Various numbers of resistive heating elements, such as resistive heating element 123, may be disposed within chamber 118, in various implementations. The resistive heating element(s), such as resistive heating element 123, may be configured for 24V electrical power, in various implementations. Controller 30 may communicate with resistive heating element 123 to control the heating thereof. The coolant exits chamber 118 through line 79, which fluidly communicates with chamber 118, as illustrated.

Limit switch 126 may be variously disposed about heater 70, as illustrated in FIG. 6C. Limit switch 126 includes a bi-metallic strip in communication with, for example, one of connectors 125, 127 to interrupt the power to resistive heating element 123 in the event the temperature exceeds some preset limit temperature. The preset limit temperature may be, for example, 192° F., or such other limit temperature that, when exceeded, might pose a risk or cause damage. Button 128, as illustrated, allows for manual reset of the limit switch 126.

In operation, when heater 70 is in the ON condition, resistive heating element 123 develops heat by electrical resistance upon receiving electrical current from power storage unit 20 so that resistive heating element 123 heats chamber 118 including coolant within chamber 118. Heat from resistive heating element 123 may pass through inner shell 108 into chamber 106 to heat the coolant as the coolant, propelled by pump 72, passes through pipes 112 and to heat further the coolant as the coolant passes from pipes 112 through chamber 106. The coolant warmed by passage through pipes 112 and by passage through chamber 106 then contacts resistive heating element 123 within chamber 118, which may lessen the current drawn by resistive heating element 123 in comparison to the current that would be drawn by resistive heating element 123 were coolant from line 77 directly flowed about resistive heating element 123 without passage through pipes 112 and chamber 106. Outer shell 101 may include insulating material disposed between outer surface 103 and inner surface 107 to retain heat within outer shell 101. Outer shell 101 and inner shell 108 may assume rectangular or other geometric shapes, in other implementations.

The various structures of heater 70 including outer shell 101, inner shell 108, plenum 102, pipes 112, and resistive heating element 123 may be formed of steel, aluminum, copper, fiberglass, various plastics, and combinations thereof, in various implementations, as would be readily recognized by those of ordinary skill in the art upon study of this disclosure.

Figure 7:
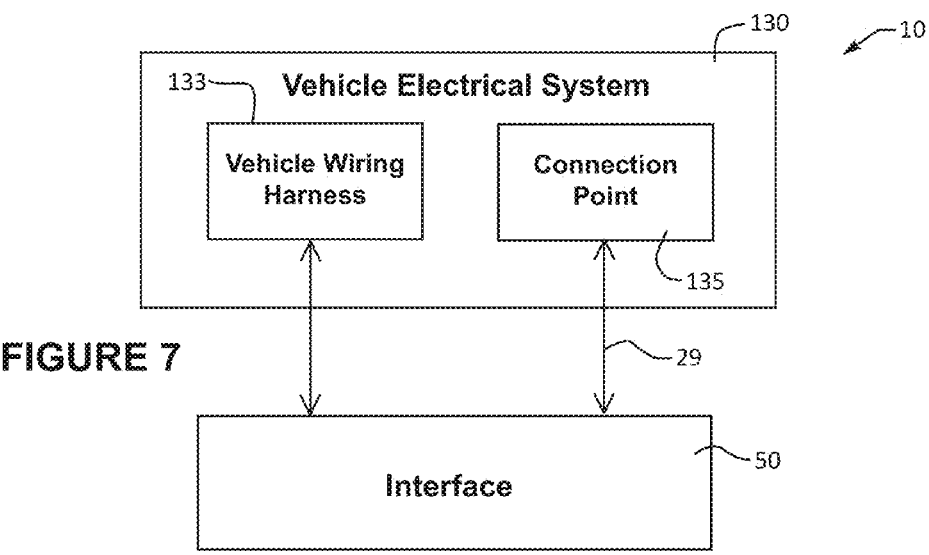
FIG. 7 illustrates by schematic diagram portions of the exemplary implementation of the idle management system of FIG. 1.

FIG. 7 illustrates the connection of interface 50 with vehicle electrical system 130. As illustrated in FIG. 7, interface 50 is connected to connection point 135 within the vehicle electrical system to flow electrical power between vehicle electrical system 130 and power storage unit 20. Connection point 135 may be, for example, an electrically communicating bolted connection between components of vehicle electrical system 135 and interface 50 may be connected to connection point 135 by bolting a cable that forms a portion of interface 50 to connection point 135.

Interface 50 is interconnected with vehicle wiring harness 133 to allow controller 30 to detect the status of vehicle electrical system 130, as illustrated in FIG. 7. The configuration of wiring harness 133 varies according to the make and model of vehicle 100. Accordingly, various mechanical connectors may be provided along with various numbers of electrical pathways to connect interface 50 with wiring harness 133 depending upon the make and model of vehicle 100.

Figure 8A:
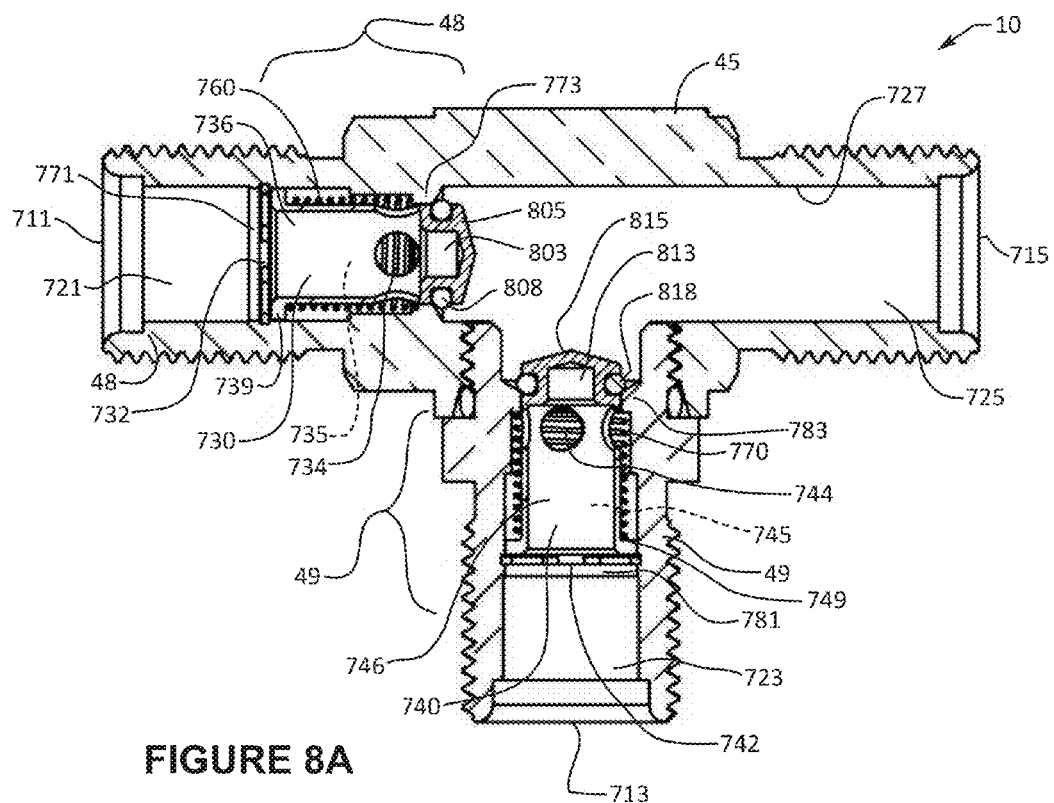
FIG. 8A illustrates by cut-away side view portions of the exemplary implementation of the idle management system of FIG. 1.
Figure 8B:
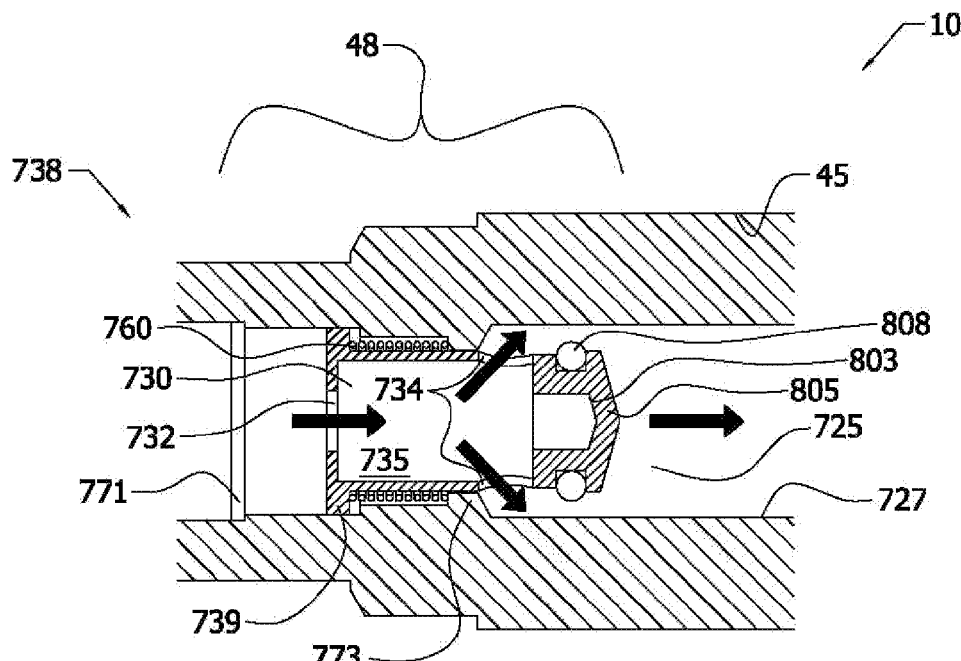
FIG. 8B illustrates by cut-away side view portions of the portions of the idle management system illustrated in FIG. 8A.
Figure 8C:
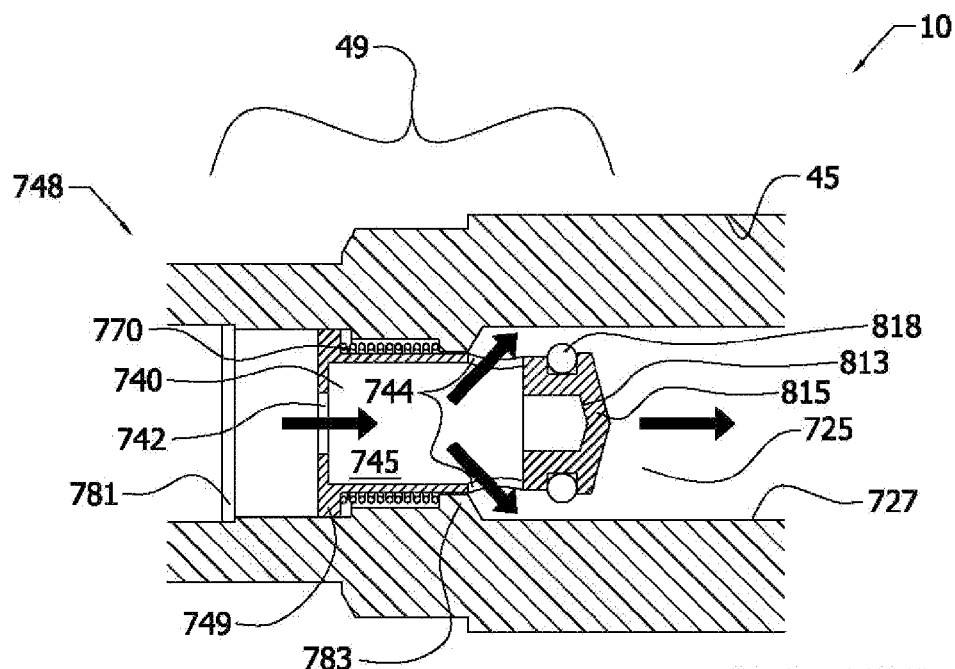
FIG. 8C illustrates by cut-away side view portions of the portions of the idle management system illustrated in FIG. 8A.

Tee 45 is illustrated in FIGS. 8A-8C. As illustrated in FIG. 8A, Tee 45 includes inlets 711, 713 and outlet 715. Working fluid may pass from vehicle compressor 142 through line 141 into inlet 711, through passage 721, then through passage 725 to outlet 715, and thence from outlet 715 of Tee 45 into the remainder of line 141 (see FIG. 3). Working fluid may pass from compressor 42 through line 41 into inlet 713, through passage 723, then through passage 725 to outlet 715, and thence from outlet 715 of Tee 45 into the remainder of line 141.

As illustrated in FIG. 8A, check valve 48 includes piston 730 that defines inner chamber 735. Hole(s) 734 are disposed circumferentially about piston 730. Nipple 803 extends from piston 730, as illustrated, and cap 805 is secured to nipple 803. O-ring 808 is secured to cap 805, as illustrated. With piston 730 in blocking position 736, as illustrated in FIG. 8A, O-ring 808 is biased against flange 773 such that O-ring 808 in combination with cap 805 blocks the flow of working fluid, through passages 721, 725 of valve 48 from inlet 711 to outlet 715. Spring 760, which is wrapped circumferentially about piston 730, engages piston flange 739 and flange 773, which is formed in wall 727 of passage 725, to hold piston 730 in blocking position 736. Spring 760 tensionably holds piston 730 against block 771, which is formed circumferentially about wall 727 when piston 730 is in blocking position 736 with O-ring 808 biased against flange 773, as illustrated.

As illustrated in FIG. 8A, check valve 49 includes piston 740 that defines inner chamber 745. Hole(s) 744 are disposed circumferentially about piston 740. Nipple 813 extends from piston 740, as illustrated, and cap 815 is secured to nipple 813. O-ring 818 is secured to cap 815, as illustrated. With piston 740 in blocking position 746, as illustrated in FIG. 8A, O-ring 818 is biased against flange 783 such that O-ring 818 in combination with cap 815 blocks the flow of working fluid through valve 49 from inlet 713 to outlet 715 via passages 723, 725. Spring 770, which is wrapped circumferentially about piston 740, engages piston flange 749 and flange 783, which is formed in wall 727 of passage 725, to hold piston 740 in blocking position 746. Spring 770 tensionably holds piston 740 against block 781, which is formed circumferentially about surface 727 when piston 740 is in blocking position 746 with O-ring 818 biased against flange 783, as illustrated.

The views in FIGS. 8B and 8C are further cut away from the view in FIG. 8A to reveal passages 735, 745 within pistons 730, 740, respectively. As illustrated in FIG. 8B, spring 760 is compressed so that piston 730 is in open position 738 with O-ring 808 set apart from flange 773 to allow working fluid to flow between O-ring 808 and flange 773 through valve 48 to outlet 715. With piston 730 in open position 738, working fluid passes through aperture 732 into passage 735 within the interior of piston 730. The working fluid may flow from passage 735 through hole(s) 734 and then between flange 773 and O-ring 808 to outlet 715. Piston 730 is altered between open position 738 and blocking position 736 by compression or expansion of spring 760, to disengage O-ring 808 with flange 773 or to engage O-ring 808 with flange 773, respectively.

As illustrated in FIG. 8C, piston 740 is in open position 748 with O-ring 818 set apart from flange 783 to allow working fluid to flow between O-ring 818 and flange 783 through valve 49 to outlet 715. With piston 740 in open position 748, working fluid passes through aperture 742 into passage 745 within the interior of piston 740. The working fluid may flow from passage 745 through hole(s) 744 and then between flange 783 and O-ring 818 to outlet 715 via portions of passage 725. Piston 740 is altered between open position 748 and blocking position 746 by compression or expansion of spring 770 to disengage O-ring 818 with flange 783 or to engage O-ring 818 with flange 783, respectively.

Methods of operation of an idle management system, such as idle management system 10, are disclosed herein. The methods disclosed herein may be implemented in software having the form of computer readable instructions adapted to execute upon one or more computers to cause the one or more computers to implement the steps of the methods. Computer, as used herein, includes microprocessor-based devices. Software may be, for example, in the form of high-level code such as C or Java, or may be in the form of machine code. In some aspects, the software may execute on one computer. In other aspects, two or more computers may communicate with one another via network, and the software may be organized in various ways such that portions of the software may be distributed over the two or more computers to be executed by the two or more computers.

The compositions of matter disclosed herein include computer readable media. Computer readable media may be any media that may be used to store information that may be accessed by the computer. Computer readable media includes both volatile and non-volatile media and both removable and non-removable media. Computer readable media may include, for example, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium that may be used to store the information and that may be accessed by the computer.

Figure 9:
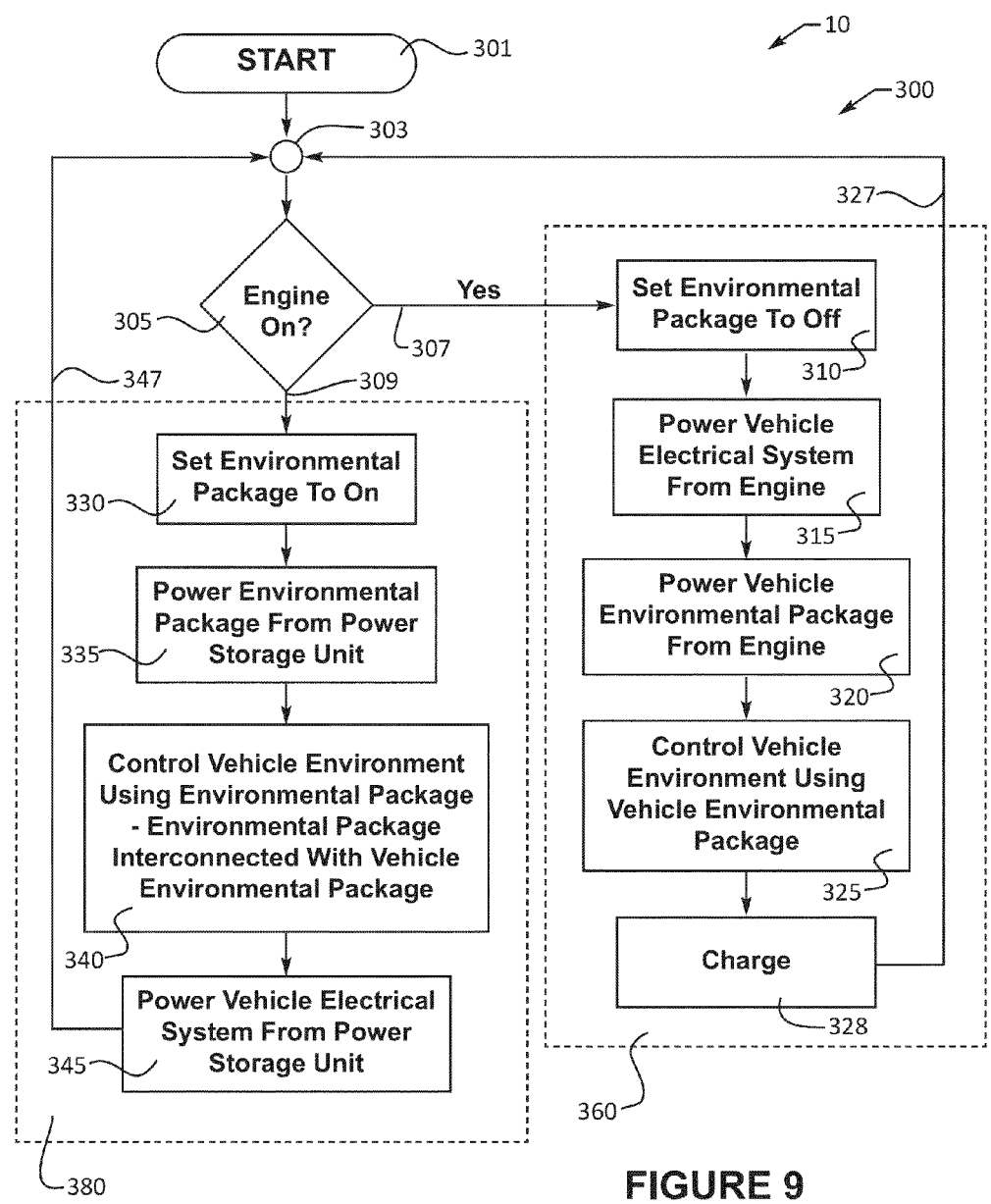
FIG. 9 illustrates by process flow chart exemplary operations of the exemplary implementation of the idle management system of FIG. 1.

Idle management system 10 may operate according to exemplary method 300 illustrated in FIG. 9, and the various steps of method 300 may be executed by controller 30 or by other computer(s) included in idle management system 10 or vehicle 100. The steps of method 300 may be in the form of computer readable instructions, and various computer readable media may be provided in idle management system 10 including controller 30 to store these computer readable instructions for access by controller 30 or by other computer(s) included in idle management system 10 or vehicle 100.

As illustrated in FIG. 9, method 300 is entered at step 301 and proceeds to step 305. At step 305, method 300 checks to determine if engine 170 is in the engine ON condition or in the engine OFF condition. Idle management system 10 may query the vehicle electrical system 130 through vehicle wiring harness 133 via interface 50 to determine if engine 170 is in the engine ON condition or the engine OFF condition at step 305.

If, at step 305, engine 170 is in the engine ON condition, method 300 branches by path 307 to step 310 of branch 360. As illustrated in FIG. 9, branch 360 includes steps 310, 315, 320, 325. The idle management system is OFF so that, as indicated by step 310, environmental package 40 is set to OFF meaning compressor 42 is in the OFF state, pump 72 is in the OFF condition, and there is no flow of electrical power to resistive heating element 123. In various implementations, idle management system 10 must be OFF before engine 170 may be altered from the engine OFF condition to the engine ON condition, for example, in order to prevent conflicts between environmental package 40 and vehicle environmental package 140.

At step 315, engine 170 powers vehicle electrical system 130, and engine 170 powers vehicle environmental package 140 per step 320. At step 325, the vehicle environment is regulated using the vehicle environmental package 140. The user may use the standard control interfaces provided with vehicle 100 by the manufacturer to regulate the operation of vehicle environmental package 140. Power storage unit 20 may be charged using alternator 80, and vehicle battery 122 may be charged using power from engine 170, at step 328. Method 300 loops back from step 328 to point 303 by path 327, and method 300 then repeats starting from point 303.

If, at step 305, engine 170 is in the engine OFF condition, method 300 branches by path 309 to step 330 of branch 380. As illustrated in FIG. 9, branch 380 includes steps 330, 335, 340, 345. The idle management system 10 is ON in branch 380. At step 330, environmental package 40 is set to ON. With environmental package 400N, compressor 42 may be in the ON state, pump 72 may be in the ON condition, and there may be flow of electrical power to resistive heating element 123, as the user uses environmental package 40 to regulate the vehicle environment of vehicle 100.

Per step 335, power storage unit 20 powers environmental package 40. At step 340, the vehicle environment is regulated using environmental package 40 in combination with vehicle environmental package 140. Environmental package 40 is interfaced with vehicle environmental package 140.

The user may direct the operation of environmental package 40 to regulate the vehicle environment using display 60, and compressor 42 may be altered between the OFF state and the ON state, pump 72 may be altered between the OFF condition and the ON condition, and electrical power may be flowed to resistive heating element 123 to regulate the vehicle environment by cooling or by heating as directed by the user using display 60.

Power storage unit 20 powers vehicle electrical system 130, at step 345. Method 300 loops back from step 345 to point 303 by path 347, and method 300 then repeats starting from point 303.

Figure 10A:
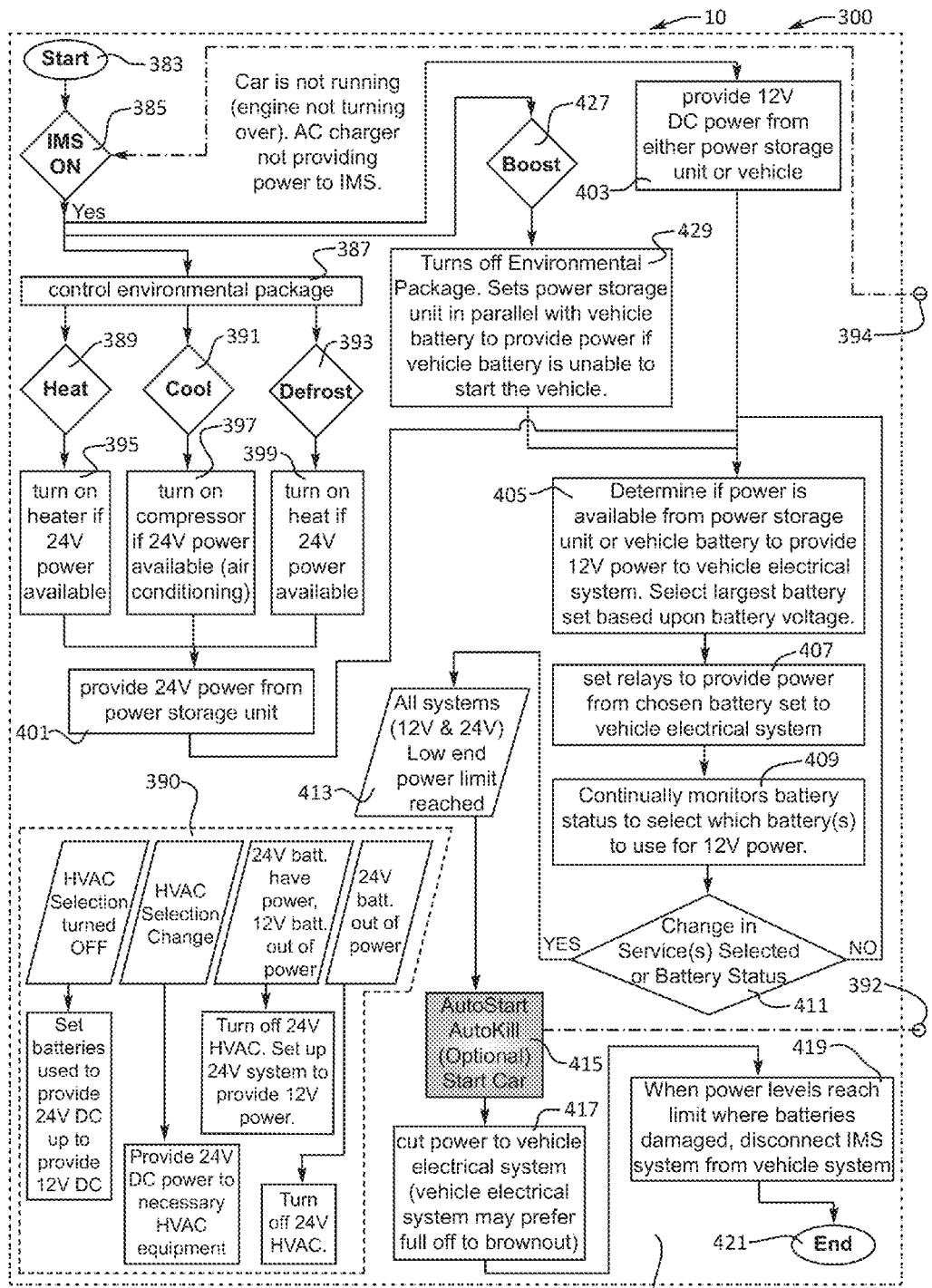
FIG. 10A illustrates by process flow chart exemplary operations of the exemplary implementation of the idle management system of FIG. 1.

FIGS. 10A and 10B illustrates exemplary implementations of branch 380 and branch 360 of exemplary method 300 in further detail. As illustrated in FIG. 10A, branch 380 of exemplary method 300 begins at step 383 and proceeds through step 385 when idle management system 10 is ON.

Environmental package 40 is ON at step 387, and user uses environmental package 40 to regulate the vehicle environment within vehicle compartment 99 of vehicle 100. If environmental package 40 provides heat as may be selected by the user, method 300 passes from step 387 through step 389 and then to step 395.

At step 395, the availability of 24V power from power storage unit 20 is ascertained, and controller 30 may so ascertain the availability of 24V power. If 24V power is available from power storage unit 20, pump 72 is set at the ON condition, heater 70 is set at the ON condition to discharge heat into the coolant as the coolant passes through heater 70, and valve 76 is set at the CLOSED position to prevent the coolant from passing through engine 170.

If environmental package 40 provides cooling (HVAC per flowchart), as may be selected by the user, method 300 passes from step 387 through step 391 and then to step 397. The availability of 24V power from power storage unit 20 is ascertained at step 397, and controller 30 may ascertain the availability of 24V power. If 24V power is available from power storage unit 20, the compressor 42 is placed in the ON state causing working fluid in the form of superheated vapor to pass from compressor 42 through line 41 and, thence, through Tee 45 into line 141, through vehicle condenser 144, through throttle valve 146, and through vehicle evaporator 148 via lines 143, 145, respectively, and returning to compressor 42 from vehicle evaporator 148 via line 147, through Tee 46, and line 47 (see FIG. 3).

If environmental package 40 provides defrosting, as may be selected by the user, method 300 passes from step 387 through step 393 and then to step 399. The availability of 24V power from power storage unit 20 is ascertained at step 399, and controller 30 may ascertain the availability of 24V power. If 24V power is available from power storage unit 20, the compressor 42 is placed in the ON state and pump 72 is set at the ON condition, heater 70 is set at the ON condition, and valve 76 is set at the CLOSED position.

At step 401, 24V power is provided to heater 70, compressor 42, or both heater 70 and compressor 42 from power storage unit 20.

Branch 380 passes from step 385 to step 403 to provide power to vehicle electrical system 130 from either vehicle battery 122 or from power storage unit 20. At step 405, either vehicle battery 122 or power storage unit 20 is selected based upon power availability. At step 407, the controller 30 toggles switches 24, 26, 28 between the ON position and the OFF (see FIG. 2) to provide 12V electrical power to vehicle electrical system 130.

At step 409, method 300 monitors the availability of 12V power from either vehicle battery 122 or from power storage unit 20. Method 300 may loop back from step 411 to step 405 to alter the source of the 12V power between the vehicle battery 122 and power storage unit 20 depending upon the availability of electrical power therefrom.

Method 300 may pass from step 411 to step 413 if the vehicle battery 122 and power storage unit 20 become depleted of electrical power. At step 415, vehicle engine 170 may be started (autostart) from the engine OFF condition into the engine ON condition to charge vehicle battery 122 and power storage unit 20, and alternator 80 may be used, at least in part, to charge power storage unit 20.

If step 415 is not included in method 300, then method 300 passes to step 417. At step 417, power from vehicle battery 122 and power storage unit 20 to environmental package 40 is shut off. Power from vehicle battery 122 and power storage unit 20 to vehicle electrical system 130 is shut off at step 417. At step 419, if the power in power storage unit 20 reaches a low level such that damage to batteries 22, 23, might occur, idle management system 10 is shut down, and then terminates at step 421.

The starter may be prevented from engaging at step 419. An under volt circuit may trigger a relay to break the circuit that transmits the signal for the starter to engage. A solid-state device may cut off the current to vehicle electrical system 130, and a relay may be used to prevent the starter from starting. The vehicle's horn may blow as a warning.

With engine 170 in the engine ON condition by step 415, method 300 may pass from step 415 of branch 380 to branch 360 through connection point 392. Connection point 392 is included in both FIGS. 10A, 10B to show the interconnection between the process flow charts of FIGS. 10A and 10B. Method 300 in branch 360 begins at step 471, as illustrated in FIG. 10B. At step 473, the charge of vehicle battery 122 and power storage unit 20 are monitored. If the charge of vehicle battery 122 and power storage unit 20 is sufficient, vehicle engine 170 is place from the engine ON condition into the engine OFF condition (autokill) at step 475. Method 300 then passes from step 475 of branch 360 to step 385 of branch 380 through connection point 394 and terminates at step 477. Connection point 394 is included in both FIGS. 10A, 10B to show the interconnection between the process flow charts of FIGS. 10A and 10B.

Branch 380 further includes a boost feature starting at step 427. At step 429, environmental package 40 is placed in the OFF state, and electrical power from both vehicle battery 122 and power storage unit 20 is used to start engine 170 from the engine OFF condition to the engine ON condition.

Steps 390 may be performed in conjunction with various steps of branch 360 or branch 380 of method 300. As illustrated in FIG. 10A, method 300 may respond, for example, to the depletion of electrical power within battery 122 and power storage unit 20 or to changes in operation of the environmental package 40 as initiated by the user using display 60 by execution of at least some of steps 390.

Steps 404 illustrated in FIG. 10B may be executed by system 300 in both the engine ON condition and the engine OFF condition. Steps 404 may be executed by system 300 whether idle management system 10 is ON or OFF.

Figure 11:
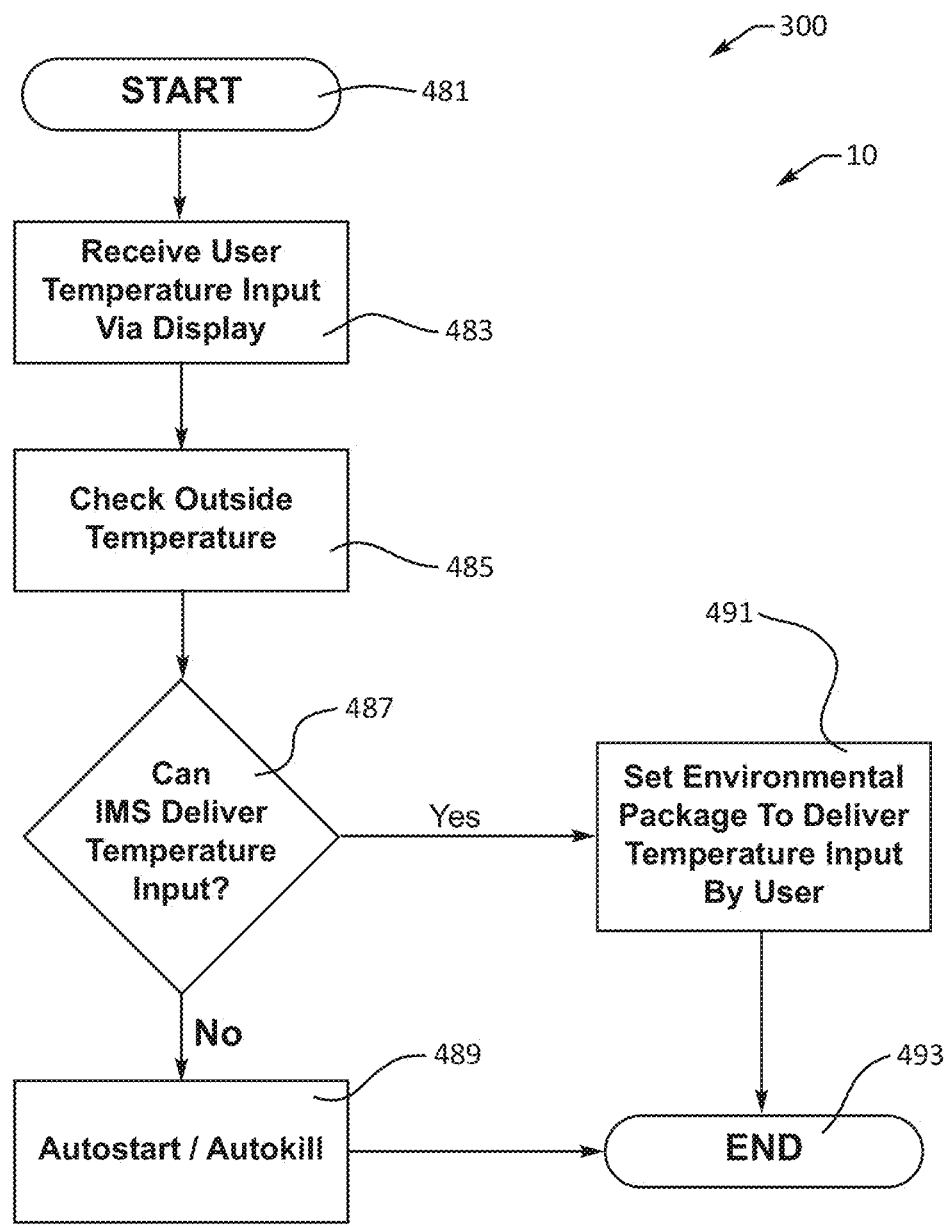
FIG. 11 illustrates by process flow chart exemplary operations of the exemplary implementation of the idle management system of FIG. 1.

In some implementations, method 300 may include steps 481, 483, 485, 487, 489, 491, 493 as illustrated in FIG. 11. Method 300 enters at step 481, as illustrated in FIG. 11. A temperature input is received from the user via display 60, at step 483. The temperature input may be a temperature that the user desires to achieve within vehicle compartment 99 of vehicle 100. Method 300 then checks the outside temperature using temperature sensor 157, at step 485. Method 300 determines if idle management system 10 can deliver the temperature input by the user, at step 487. The difference between the outside temperature and the temperature input as well as power available from power storage unit 20 may be used to make the determination per step 487. If the idle management system can deliver the input temperature, method 300 branches from step 487 to step 491. The environmental package 40 is configured to deliver the input temperature at step 491. The method illustrated in FIG. 11 terminates at step 493.

If the idle management system cannot deliver the input temperature, method 300 branches from step 487 to step 489. The engine is started from the engine OFF condition into the engine ON condition at step 489, so that engine 170, along with vehicle environmental package 140, is used to deliver the input temperature to vehicle compartment 99. As illustrated in FIG. 11, the method terminates at step 493.

Figure 12:
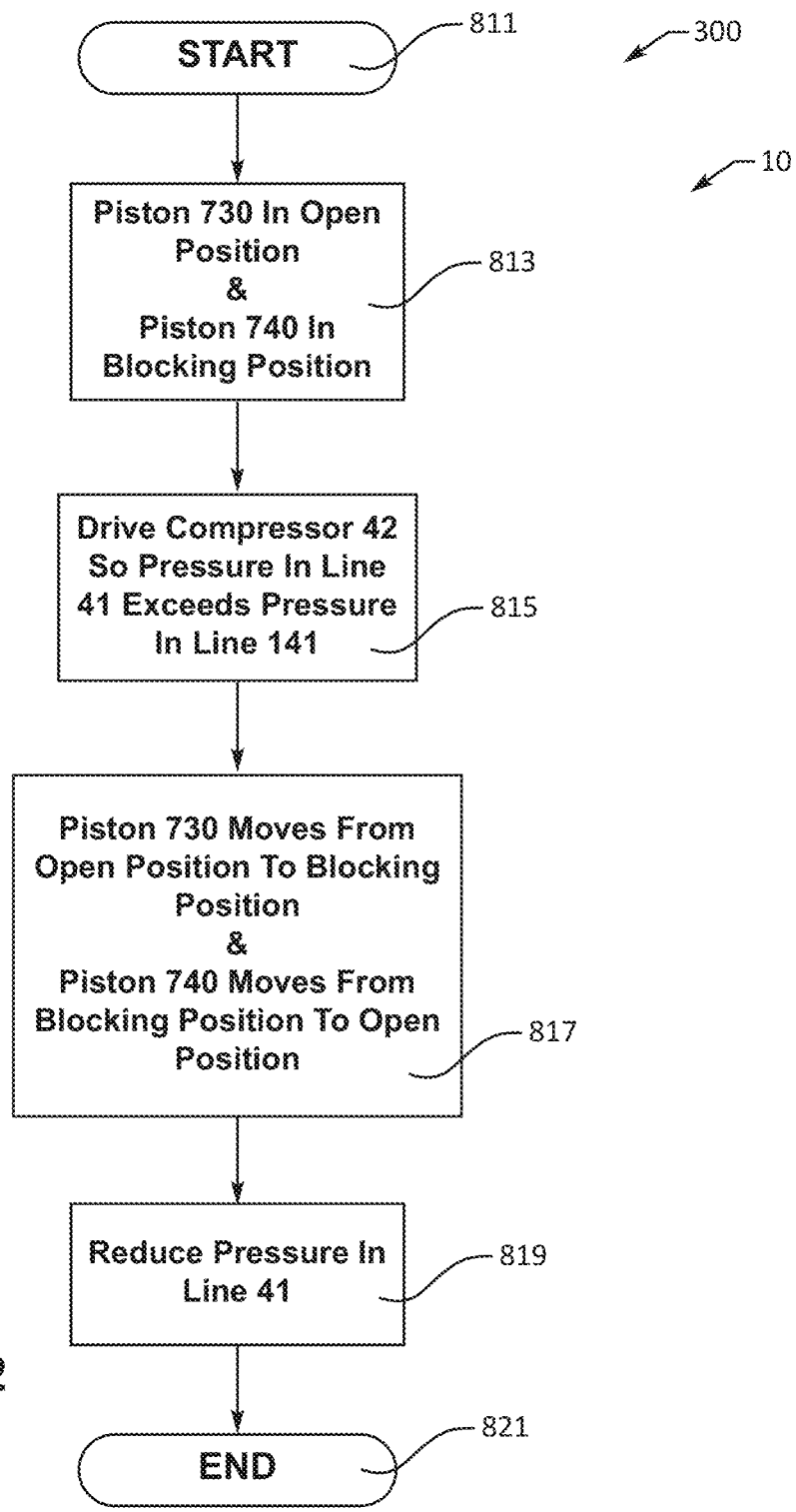
FIG. 12 illustrates by process flow chart exemplary operations of the exemplary implementation of the idle management system of FIG. 1; and, FIG. 13 illustrates by perspective view positions of key in ignition of the vehicle.

Method 300 may actuate check valves 48, 49 of Tee 45 as illustrated in FIG. 12 to flow working fluid from compressor 42 through line 41, through Tee 45 and into line 141 to vehicle evaporator 148. The method, as illustrated in FIG. 12, is initiated at step 811 and proceeds to step 813. At step 813, piston 730 of check valve 48 is in open position 738 such that working fluid may flow through check valve 48 of Tee 45. Piston 740 of check valve 49 is in blocking position 746 such that working fluid cannot flow through check valve 49 of Tee 45. Accordingly, at step 813, the working fluid may pass from vehicle compressor 142 through line 141 including Tee 45 to vehicle condenser 144, while flow is blocked between line 141 and line 41 by check valve 49.

At step 815, compressor 42 is driven so that pressure in line 41 exceeds pressure in line 141, which causes piston 730 to move from open position 738 to blocking position 736 and piston 740 to move from blocking position 746 to open position 748 at step 817. Per step 817, working fluid may flow from line 41 to line 141 through check valve 49 of Tee 45 and flow of working fluid is blocked through check valve 48 of Tee 45.

With flow established from line 41 to line 141 through check valve 49 of Tee 45, compressor 42 is adjusted to reduce the pressure in line 41 at step 819. The method terminates at step 821, as illustrated.

Idle management system 10 may be installed within vehicle 100 by placement of controller 30, power storage unit 20, environmental package 40, interface 50, display 60, about vehicle 100. Interface 50 is connected to vehicle electrical system 130. Alternator 80 is placed about vehicle 100 so that alternator 80 mechanically cooperates with engine 170 such that engine 170 powers alternator 80. Temperature sensors 153, 157 may be disposed about vehicle interior 99 and exterior to vehicle 100, respectively.

Compressor 42 of idle management system 10 is placed in cooperation with vehicle environmental package 140 during installation of idle management system 10. In various implementations, vehicle environmental system 140 may include vehicle compressor 142, vehicle condenser 144, throttle valve 146, vehicle evaporator 148 along with lines 141, 143, 145, 147 (see FIG. 3). Tee 45 is inserted into line 141 between vehicle compressor 142 and vehicle condenser 144, as illustrated in FIG. 3. Tee 46 is inserted into line 147 between vehicle evaporator 148 and vehicle compressor 142, as illustrated in FIG. 3.

In various implementations, vehicle environmental system 140 may include pump 172, engine 170, heat exchangers 171, 174, and lines 175, 177, 179, 181 (see FIG. 4). Heater 70 and pump 72 may be connected to lines 175 and 179 by insertion of Tee's 71, 73 therein, respectively, as illustrated in FIG. 4, to interconnect environmental package 40 with vehicle environmental package 140. Valves 76, 78 may be inserted into lines 179, 181, respectively.

In various implementations, SMS text and/or smart phone application may be used, for example, for reporting alarms, controlling environmental package 40, reporting battery charges, reporting temperature and auxiliary equipment such as lights, and remote starting the vehicle. This is accomplished by connecting a GSM modem to the integrated controller to read and control the idle management system, the interface and the vehicle using common SMS text messages as a transport protocol for commands and alias. Idle management system 10 may automatically sends status messages notifying the user, for example, that alarm thresholds have been met. The user may engage autostart and autokill remotely.

Shore power may be provided to idle management system 10 from mains electric, in various implementations, to charge power storage unit 20 or vehicle battery 122. The mains electric power may be 15 amp 110 V AC electric power. The idle management system 10 including environmental package 40 and vehicle electrical system 130 through interface 50 may be operable using mains electric while power storage unit 20 or vehicle battery 122 are being charged by the mains electric. This allows idle management system 10 to regulate the vehicle climate for the user and boot all electronics before the user arrives, without depleting the stored energy reserve, while the vehicle is connected to an AC power outlet.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A system for providing air conditioning to a passenger compartment of a vehicle, comprising:
   a) a primary power source for providing power to said system;
   b) a secondary power source for providing power to said system when said primary power source is not operating;
   c) a controller;
   d) a primary compressor, wherein said primary compressor is operably connected to said primary power source to obtain operating power therefrom;
   e) a condenser;
   f) an evaporator;
   g) a secondary compressor, wherein said secondary compressor is operably connected to said secondary power source to obtain operating power therefrom;
   h) a first fluid line connecting said primary compressor to said condenser;
   i) a second fluid line connecting said condenser to said evaporator;
   j) a third fluid line connecting said evaporator to said primary compressor;
   k) a fourth fluid line connecting said third fluid line to said secondary compressor; and
   l) a fifth fluid line connecting said secondary compressor to said first fluid line, wherein said fifth fluid line is connected to said first fluid line through a T-connector;
   m) wherein said controller is operable to activate said primary compressor to urge a working fluid through said system to provide air conditioning to the passenger compartment while said primary power source is operating, wherein said secondary compressor is deactivated when said primary compressor is activated;
   n) wherein said controller is further operable to activate said secondary compressor to urge said working fluid through said system to provide air conditioning to the passenger compartment while said primary power source is not operating, wherein said primary compressor is deactivated when said secondary compressor is activated;
   o) wherein said T-connector comprises a first check valve for controlling flow of said working fluid between said primary compressor and said T-connector and a second check valve for controlling flow of said working fluid between said secondary compressor and said T-connector;
   p) wherein said second check valve is closed when said primary compressor is activated such that said working fluid bypasses said secondary compressor as said working fluid flows through said system and said working fluid is prevented from back flowing from said T-connector to said secondary compressor;
   q) wherein said first check valve is closed when said secondary compressor is activated such that said working fluid bypasses said primary compressor as said working fluid flows through said system and said working fluid is prevented from back flowing from said T-connector to said primary compressor.

2. A system according to claim 1, wherein said primary power source is an internal combustion engine.

3. A system according to claim 2, wherein said secondary power source comprises at least one battery, wherein said at least one battery is recharged by said internal combustion engine when said internal combustion engine is operating.

4. A system according to claim 1, wherein said controller is further operable to activate said secondary compressor to increase pressure of said working fluid in said fifth fluid line until the pressure of said working fluid in said fifth fluid line exceeds the pressure of said working fluid in said first fluid line and thereby open said second check valve and close said first check valve.

5. A system according to claim 1, wherein said T-connector comprises a first inlet and a first inlet passageway having a first annular flange formed at an innermost end of said first inlet passageway, a second inlet and a second inlet passageway having an annular flange formed at an innermost end of said second inlet passageway, and an outlet and an outlet passageway, wherein said first inlet is in fluid communication with said outlet through said first inlet passageway and said outlet passageway, wherein said second inlet is in fluid communication with said outlet through said second inlet passageway and said outlet passageway.

6. A system according to claim 5, wherein said first check valve comprises a hollow first piston slidably mounted within said first inlet passageway, said first piston having a first end having an opening therein, a second end extending through said first annular flange and into said outlet passageway and having a first annular sealing member affixed thereto, and at least one opening through a sidewall of said first piston between said first end and said second end of said first piston, wherein said first annular sealing member is spring-biased against said first annular flange to close said first check valve and thereby block said working fluid from back flowing from said T-connector to said primary compressor.

7. A system according to claim 6, wherein said second check valve comprises a hollow second piston slidably mounted within said second inlet passageway, said second piston having a first end having an opening therein, a second end extending through said second annular flange and into said outlet passageway and having a second annular sealing member affixed thereto, and at least one opening through a sidewall of said second piston between said first end and said second end of said second piston, wherein said second annular sealing member is spring-biased against said second annular flange to close said second check valve and thereby block said working fluid from back flowing from said T-connector to said secondary compressor.

8. A system according to claim 6, wherein said working fluid from said primary compressor is operable to open said first check valve such that said working fluid flows into said first inlet, through said first piston and out of said at least one opening through said sidewall of said first piston and into said outlet passageway, and out of said outlet of said T-connector.

9. A system according to claim 7, wherein said working fluid from said secondary compressor is operable to open said second check valve such that said working fluid flows into said second inlet, through said second piston and out of said at least one opening through said sidewall of said second piston and into said outlet passageway, and out of said outlet of said T-connector.

10. A system for providing air conditioning to a passenger compartment of a vehicle, comprising:
   a) a primary power source for providing power to said system, wherein said primary power source is an internal combustion engine;
   b) a secondary power source for providing power to said system when said primary power source is not operating, wherein said secondary power source comprises at least one battery, wherein said at least one battery is recharged by said internal combustion engine when said internal combustion engine is operating;

c) a controller;
d) a primary compressor, wherein said primary compressor is operably connected to said primary power source to obtain operating power therefrom;
e) a condenser;
f) an evaporator;
g) a secondary compressor, wherein said secondary compressor is operably connected to said secondary power source to obtain operating power therefrom;
h) a first fluid line connecting said primary compressor to said condenser;
i) a second fluid line connecting said condenser to said evaporator;
j) a third fluid line connecting said evaporator to said primary compressor;
k) a fourth fluid line connecting said third fluid line to said secondary compressor, wherein said fourth fluid line is connected to said third fluid line through a first T-connector; and
l) a fifth fluid line connecting said secondary compressor to said first fluid line, wherein said fifth fluid line is connected to said first fluid line through a second T-connector;
m) wherein said second T-connector comprises a first check valve for controlling flow of a working fluid between said primary compressor and said second T-connector;
n) wherein said second T-connector comprises a second check valve for controlling flow of said working fluid between said secondary compressor and said second T-connector;
o) wherein said controller is operable to activate said primary compressor to urge said working fluid through said system to provide air conditioning to the passenger compartment while said primary power source is operating, wherein said secondary compressor is deactivated when said primary compressor is activated, wherein said second check valve is closed when said primary compressor is activated such that said working fluid bypasses said secondary compressor as said working fluid flows through said system and said working fluid is prevented from back flowing from said second T-connector to said secondary compressor;
p) wherein said controller is further operable to activate said secondary compressor to urge said working fluid through said system to provide air conditioning to the passenger compartment while said primary power source is not operating, wherein said primary compressor is deactivated when said secondary compressor is activated, wherein said first check valve is closed when said secondary compressor is activated such that said working fluid bypasses said primary compressor as said working fluid flows through said system and said working fluid is prevented from back flowing from said second T-connector to said primary compressor.

11. A method of providing air conditioning to a passenger compartment of a vehicle powered by an internal combustion engine, comprising the steps of:
i) providing a system for providing air conditioning to said passenger compartment, wherein said system comprises:
(a) a primary compressor, wherein said primary compressor is operably connected to said internal combustion engine to obtain operating power therefrom;
(b) a condenser;
(c) an evaporator;
(d) a secondary compressor, wherein said secondary compressor is operably connected to at least one battery to obtain operating power therefrom, wherein said at least one battery is recharged by said internal combustion engine when said internal combustion engine is operating;
(e) a first fluid line connecting said primary compressor to said condenser;
(f) a second fluid line connecting said condenser to said evaporator;
(g) a third fluid line connecting said evaporator to said primary compressor;
(h) a fourth fluid line connecting said third fluid line to said secondary compressor; and
(i) a fifth fluid line connecting said secondary compressor to said first fluid line, wherein said fifth fluid line is connected to said first fluid line through a T-connector, wherein said T-connector comprises a first check valve for controlling flow of a working fluid between said primary compressor and said T-connector, wherein said T-connector further comprises a second check valve for controlling flow of the working fluid between said secondary compressor and said T-connector;
ii) turning ON said internal combustion engine;
iii) activating said primary compressor to urge the working fluid through said system to provide air conditioning to said passenger compartment while said internal combustion engine is operating, wherein said secondary compressor is deactivated when said primary compressor is activated, wherein said second check valve is closed when said primary compressor is activated such that the working fluid bypasses said secondary compressor as the working fluid flows through said system and the working fluid is prevented from back flowing from said T-connector to said secondary compressor;
iv) turning OFF said internal combustion engine;
v) activating said secondary compressor to increase pressure of the working fluid in said fifth fluid line until the pressure in said fifth fluid line exceeds pressure of the working fluid in said first fluid line, wherein said primary compressor is deactivated when said secondary compressor is activated;
vi) closing said first check valve and opening said second check valve; and
vii) activating said secondary compressor to urge the working fluid through said system to provide air conditioning to said passenger compartment while said internal combustion engine is not operating, wherein the working fluid bypasses said primary compressor as the working fluid flows through said system and the working fluid is prevented from back flowing from said T-connector to said primary compressor.

12. A system for providing air conditioning to a passenger compartment of a vehicle, comprising:
a) a primary power source for providing power to said system;
b) a secondary power source for providing power to said system when said primary power source is not operating;
c) a controller;
d) a primary compressor, wherein said primary compressor is operably connected to said primary power source to obtain operating power therefrom;
e) a condenser;
f) an evaporator;

g) a secondary compressor, wherein said secondary compressor is operably connected to said secondary power source to obtain operating power therefrom;
h) a first fluid line connecting said primary compressor to said condenser;
i) a second fluid line connecting said condenser to said evaporator;
j) a third fluid line connecting said evaporator to said primary compressor;
k) a fourth fluid line connecting said third fluid line to said secondary compressor;
l) a fifth fluid line connecting said secondary compressor to said first fluid line;
m) a 3-way connector forming a connection point between said fifth fluid line and said first fluid line, wherein said 3-way connector comprises a first inlet and a first inlet passageway having a first annular flange formed at an innermost end of said first inlet passageway, a second inlet and a second inlet passageway having an annular flange formed at an innermost end of said second inlet passageway, and an outlet and an outlet passageway, wherein said first inlet is in fluid communication with said outlet through said first inlet passageway and said outlet passageway, wherein said second inlet is in fluid communication with said outlet through said second inlet passageway and said outlet passageway;
n) a first check valve slidably mounted within said 3-way connector for controlling flow of said working fluid between said primary compressor and said 3-way connector, wherein said first check valve comprises a hollow first piston slidably mounted within said first inlet passageway, said first piston having a first end having an opening therein, a second end extending through said first annular flange and into said outlet passageway and having a first annular sealing member affixed thereto, and at least one opening through a sidewall of said first piston between said first end and said second end of said first piston, wherein said first annular sealing member is biased against said first annular flange to close said first check valve and thereby block said working fluid from back flowing from said 3-way connector to said primary compressor; and
o) a second check valve slidably mounted within said 3-way connector for controlling flow of said working fluid between said secondary compressor and said 3-way connector, wherein said second check valve comprises a hollow second piston slidably mounted within said second inlet passageway, said second piston having a first end having an opening therein, a second end extending through said second annular flange and into said outlet passageway and having a second annular sealing member affixed thereto, and at least one opening through a sidewall of said second piston between said first end and said second end of said second piston, wherein said second annular sealing member is biased against said second annular flange to close said second check valve and thereby block said working fluid from back flowing from said 3-way connector to said secondary compressor;

p) wherein said controller is operable to activate said primary compressor to urge a working fluid through said system to provide air conditioning to the passenger compartment while said primary power source is operating, wherein said working fluid from said primary compressor is operable to open said first check valve such that said working fluid flows into said first inlet, through said first piston and out of said at least one opening through said sidewall of said first piston and into said outlet passageway, and out of said outlet of said 3-way connector;

q) wherein said secondary compressor is deactivated when said primary compressor is activated, wherein said second check valve is closed when said primary compressor is activated such that said working fluid bypasses said secondary compressor as said working fluid flows through said system;

r) wherein said controller is further operable to activate said secondary compressor to urge said working fluid through said system to provide air conditioning to the passenger compartment while said primary power source is not operating, wherein said working fluid from said secondary compressor is operable to open said second check valve such that said working fluid flows into said second inlet, through said second piston and out of said at least one opening through said sidewall of said second piston and into said outlet passageway, and out of said outlet of said 3-way connector;

t) wherein said primary compressor is deactivated when said secondary compressor is activated, wherein said first check valve is closed when said secondary compressor is activated such that said working fluid bypasses said primary compressor as said working fluid flows through said system.

13. A system according to claim 12, wherein said controller is further operable to activate said secondary compressor to increase pressure of said working fluid in said fifth fluid line until the pressure of said working fluid in said fifth fluid line exceeds the pressure of said working fluid in said first fluid line and thereby open said second check valve and close said first check valve.

* * * * *